(12) United States Patent
Morifuji et al.

(10) Patent No.: US 9,832,445 B2
(45) Date of Patent: Nov. 28, 2017

(54) STEREOSCOPIC IMAGE DISPLAY SYSTEM, DISPARITY CONVERSION DEVICE, DISPARITY CONVERSION METHOD, AND PROGRAM

(71) Applicant: Sony Corporation, Tokyo (JP)

(72) Inventors: Takafumi Morifuji, Tokyo (JP); Suguru Ushiki, Tokyo (JP); Masami Ogata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/789,404

(22) Filed: Jul. 1, 2015

(65) Prior Publication Data

US 2015/0304626 A1 Oct. 22, 2015

Related U.S. Application Data

(63) Continuation of application No. 13/126,966, filed as application No. PCT/JP2010/064025 on Aug. 19, 2010, now Pat. No. 9,094,659.

(30) Foreign Application Priority Data

Aug. 31, 2009 (JP) .................... 2009-199139

(51) Int. Cl.
*H04N 15/00* (2006.01)
*H04N 13/00* (2006.01)
(Continued)

(52) U.S. Cl.
CPC ..... *H04N 13/0022* (2013.01); *G02B 27/2214* (2013.01); *G06T 7/97* (2017.01); *H04N 13/0018* (2013.01); *H04N 2013/0081* (2013.01)

(58) Field of Classification Search
CPC ........ H04N 15/00; H04N 13/00; H04N 13/04; H04N 13/02; H04N 5/92; H04N 5/89
(Continued)

(56) References Cited

U.S. PATENT DOCUMENTS 8,111,906 B2 2/2012 Song et al.
8,150,192 B2 * 4/2012 Niemeyer ............. G06T 7/0012
382/128
(Continued)

FOREIGN PATENT DOCUMENTS

EP 1 968 329 A2 9/2008
JP 2002-223458 * 8/2002 ............. H04N 13/02
(Continued)

OTHER PUBLICATIONS

Machine translation of JP 2002-223458, Aug. 2008, "Stereoscopic Video Image Generator", Yano et al.*
(Continued)

*Primary Examiner* — Daquan Zhao
(74) *Attorney, Agent, or Firm* — Oblon, McClelland, Maier & Neustadt, L.L.P.

(57) ABSTRACT

To reduce burden of a viewer at the time of performing stereoscopic display by a stereoscopic display device and to show a stereoscopic image in a natural and comfortable manner.

A disparity estimating unit 210 estimates disparity from the left and right images of an input image to generate a disparity map. A disparity analyzing unit 230 analyzes the disparity map to generate a disparity control parameter for performing suitable disparity control. A disparity control unit 240 controls the content of processing at an image conversion unit 250 in accordance with the disparity control parameter. The image conversion unit 250 performs image conversion on the input image based on the control by the
(Continued)

disparity control unit 240 to output an output image. The image conversion unit 250 performs image conversion of two steps. The image conversion unit 250 performs shift processing for shifting the relative positions of the left and right images of the input image in the horizontal direction as first step image conversion, for example. The image conversion unit 250 performs scaling processing for performing enlargement/reduction of the entire screen with each center of the left and right images as a reference, as second step image conversion, for example.

12 Claims, 34 Drawing Sheets

(51) Int. Cl.
*H04N 13/04* (2006.01)
*H04N 13/02* (2006.01)
*G02B 27/22* (2006.01)
*G06T 7/00* (2017.01)
*H04N 5/92* (2006.01)
*H04N 5/89* (2006.01)

(58) Field of Classification Search
USPC ..... 348/43, 44, 42, 47, 48, 51; 386/326, 335
See application file for complete search history.

(56) References Cited

U.S. PATENT DOCUMENTS

| | | |
|---|---|---|
| 2005/0190180 A1 | 9/2005 | Jin et al. |
| 2006/0203085 A1* | 9/2006 | Tomita ............... H04N 13/0018 348/51 |
| 2007/0082742 A1* | 4/2007 | Takizawa ................ A63F 13/10 463/43 |
| 2009/0317061 A1 | 12/2009 | Jung et al. |
| 2010/0020225 A1* | 1/2010 | Hosoi ................... G06T 3/4007 348/333.12 |
| 2010/0103460 A1* | 4/2010 | Murayama ............ G06F 3/1205 358/1.15 |
| 2010/0318914 A1* | 12/2010 | Zitnick, III .......... G11B 27/034 715/719 |

FOREIGN PATENT DOCUMENTS

| | | |
|---|---|---|
| JP | 2002-223458 | 9/2002 |
| JP | 3978392 | 6/2007 |

OTHER PUBLICATIONS

International Search Report from Japanese patent Office for PCT/JP2010/064025, dated Nov. 16, 2010.
Machine Translation of JP 2002-223458, Yano Sumio, Sep. 2002.
Extended European Search Report dated Jun. 16, 2016 in Patent Application No. 10811760.7.
J. S. McVeigh, "Algorithm for automated eye strain reduction in real stereoscopic images and sequences", Optomechatronic micro/nano devices and components III, XP002609907, 1996, 10 Pages.
Efstathios Stavrakis, "Interactive tools for image-based stereoscopic artwork", Proc. of SPIE-IS&T Electronic Imaging, vol. 6803, XP040431034, 2008, pp. 68031P-1-68031P-11.

\* cited by examiner

FIG. 17
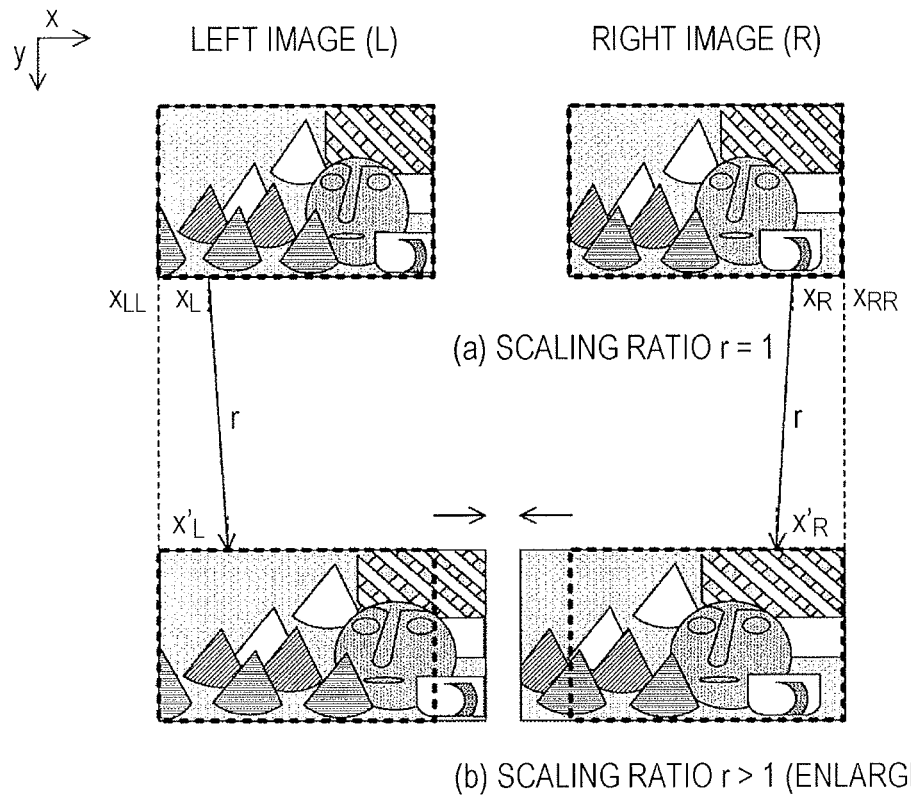
(a) SCALING RATIO r = 1
(b) SCALING RATIO r > 1 (ENLARGED)
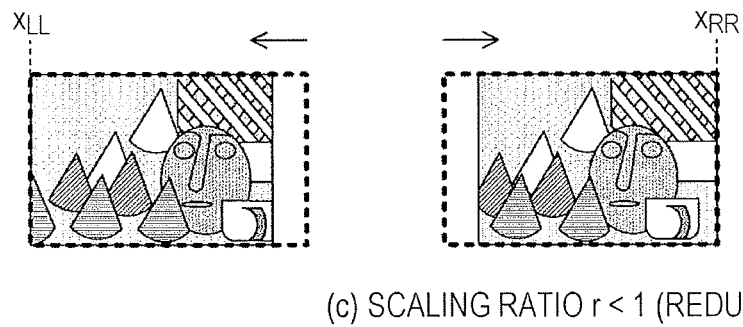
(c) SCALING RATIO r < 1 (REDUCED)

FIG. 22

| DISPARITY CONTROL PARAMETER | | RECOMMENDED SETTING POSITION |
|---|---|---|
| SHIFT | SHIFT AMOUNT s [PIXELS] | −128 TO +128 |
| SCALING | RATIO r [TIMES] | 0.80 TO 1.20 |
| | REFERENCE POSITION | FRAME CENTER, FRAME INNER SIDE, FRAME OUTER SIDE |

FIG. 23

| ABSTRACTION DISPARITY CONTROL PARAMETER | | DISPARITY CONTROL PARAMETER | | |
|---|---|---|---|---|
| | | SHIFT | SCALING | |
| | | SHIFT AMOUNT s [PIXELS] | RATIO r [TIMES] | REFERENCE POSITION |
| PERFORM DISPARITY CONTROL | "STRONG" | 60 | 0.85 | FRAME CENTER |
| | "MIDDLE" | 40 | 0.90 | FRAME CENTER |
| | "WEAK" | 0 | 1.03 | FRAME INNER SIDE |
| PERFORM NO DISPLAY CONTROL | "OFF" | 0 | 1.00 | — |

FIG. 25
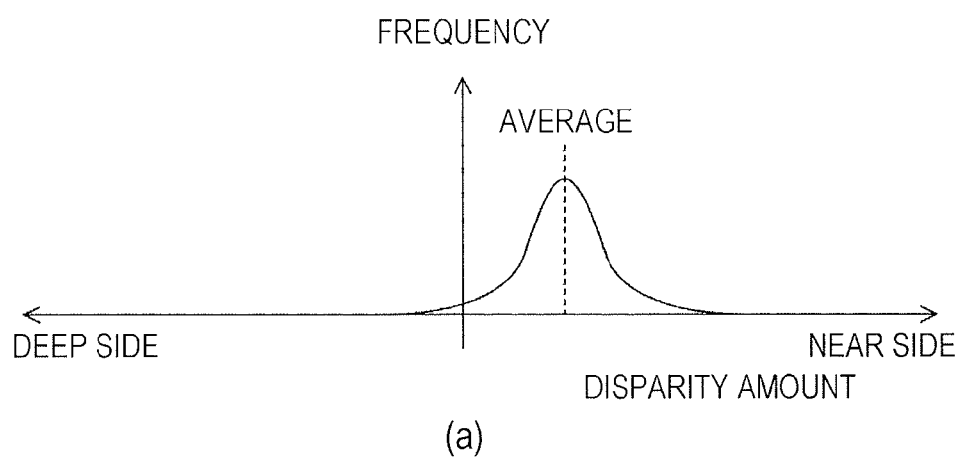
(a)
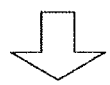
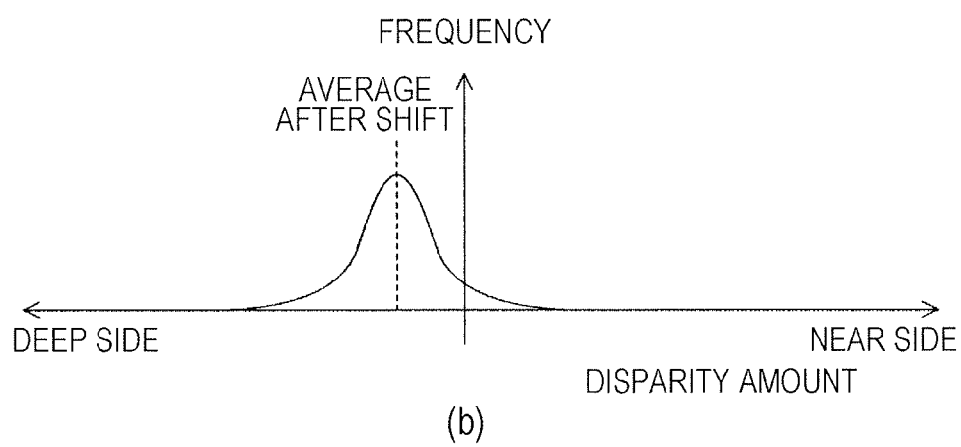
(b)

FIG. 26
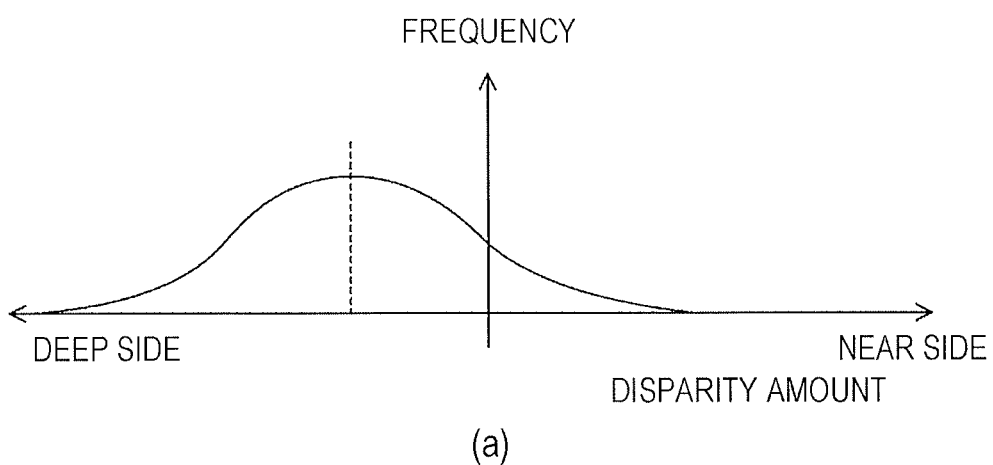
(a)
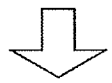
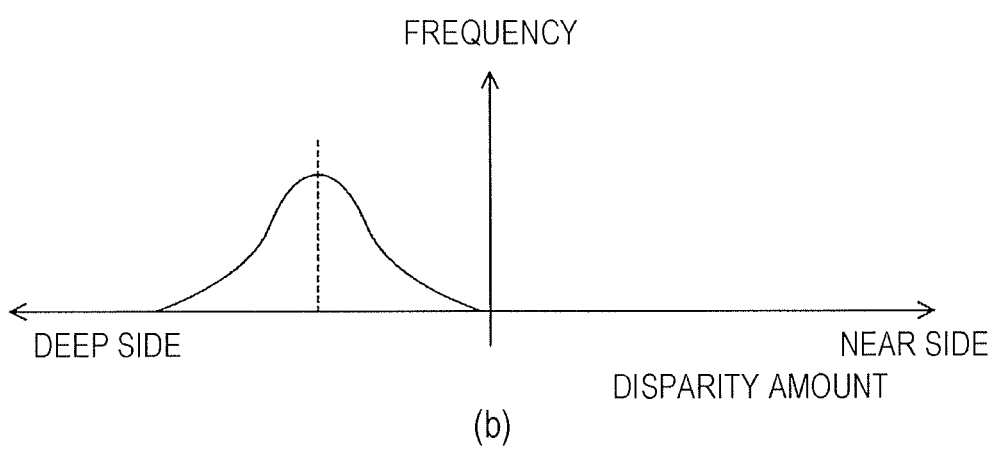
(b)

FIG. 30
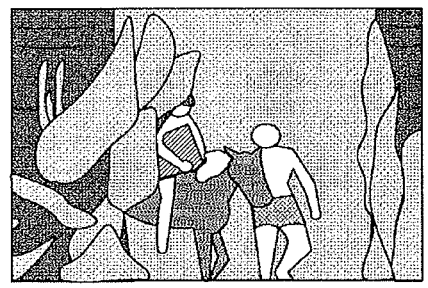
(a)
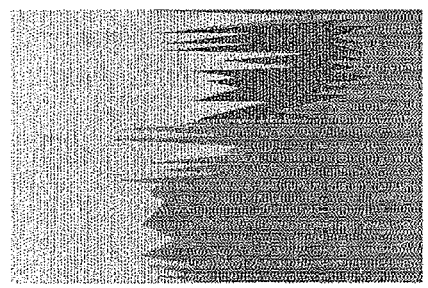
(b) DISPARITY MAP
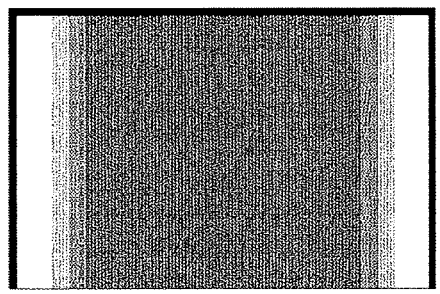
(c) REGION-OF-INTEREST MAP IN
CONSIDERATION OF IMAGE FRAME
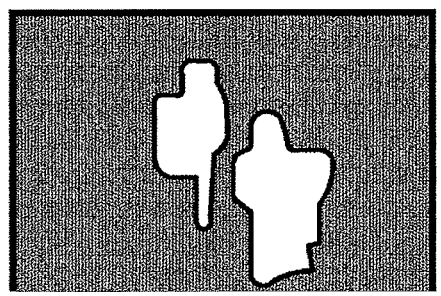
(d) REGION-OF-INTEREST MAP IN WHICH
ATTENTION IS PAID TO SUBJECT FIG. 31
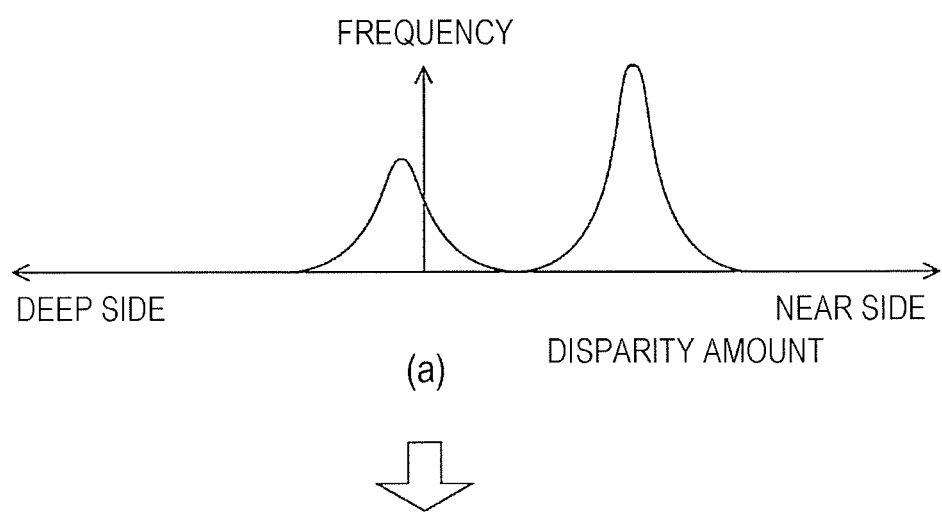
(a)
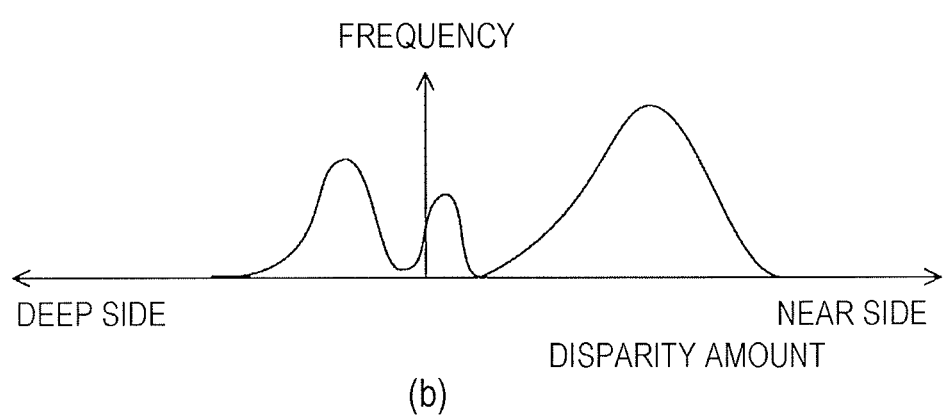
(b)

FIG. 34
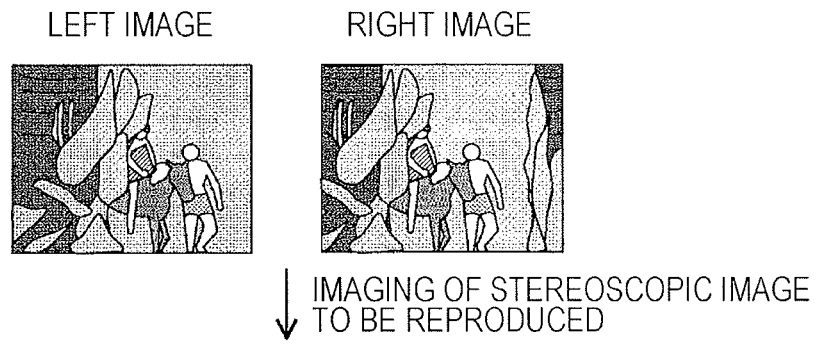
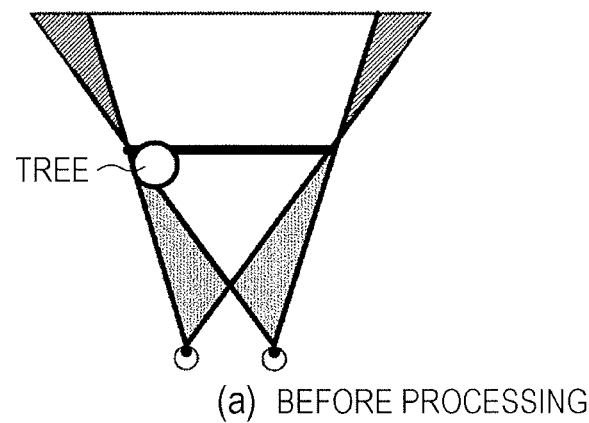
(a) BEFORE PROCESSING
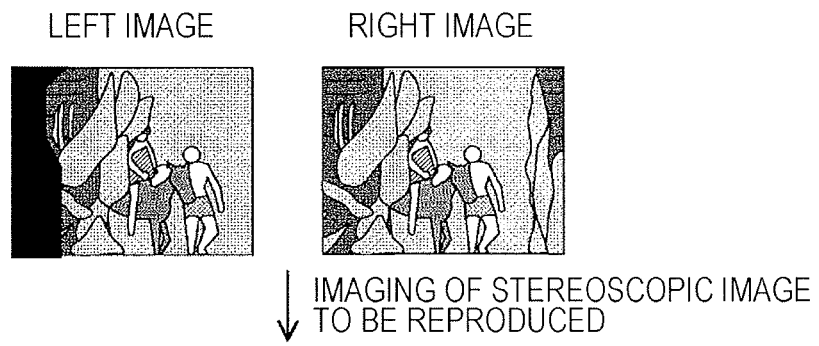
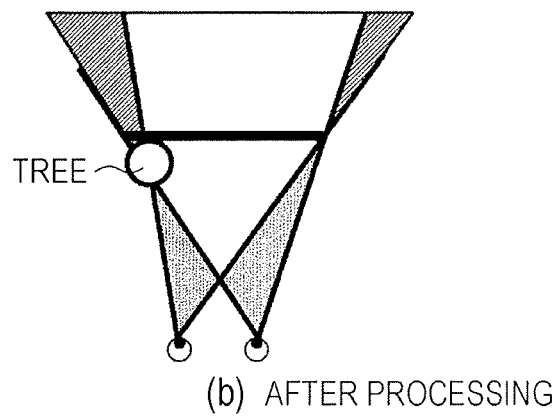
(b) AFTER PROCESSING

STEREOSCOPIC IMAGE DISPLAY SYSTEM, DISPARITY CONVERSION DEVICE, DISPARITY CONVERSION METHOD, AND PROGRAM

CROSS-REFERENCE TO RELATED APPLICATIONS/INCORPORATION BY REFERENCE

The present continuation application claims the benefit of priority under 35 U.S.C. §121 to application Ser. No. 13/126,966, filed on Mar. 26, 2012, which was the National Stage of International Application No. PCT/JP2010/064025, filed on Aug. 19, 2010, which claimed priority of Japanese Application No. 2009-199139, filed on Aug. 31, 2009. The entire contents of which are incorporated herein by reference.

TECHNICAL FIELD

The present invention relates to a stereoscopic image display system, and specifically relates to a disparity conversion device and a stereoscopic image display system which convert disparity in a stereoscopic image, and a processing method in these, and a program causing a computer to execute this method.

BACKGROUND ART

In recent years, a technique for displaying stereoscopic images by an image display device has been employed. At the time of viewing such a stereoscopic image displayed by the image display device, focal distance differs even if the real world and the angle of convergence are the same, which becomes a factor for causing visual fatigue. In particular, a case where change in disparity is great, such as a case where a certain portion within a screen protrudes extremely, or a case where an object improperly protrudes during display of a moving image, or the like, becomes a burden on a viewer.

Therefore, conventionally, in order to perform natural stereoscopic display, a technique has been proposed wherein the degree of protrusion, and depth feel are adjusted by setting an offset for shifting the right image to the right side or left side as to the left image (e.g., see PTL 1).

CITATION LIST

Patent Literature

PTL 1: Japanese Patent No. 3978392 (FIGS. 3 and 4)

SUMMARY OF INVENTION

Technical Problem

With the above conventional technique, there is a need to shift the right image to the right side as to the left image to weaken the degree of protrusion, and to shift the right image to the left side as to the left image to weaken depth feel. Accordingly, the entirety of the stereoscopic image moves according to the direction where the right image is shifted, which makes it difficult to perform adjustment in consideration of the dynamic range of the distribution of disparity.

The present invention has been made in light of such a situation, and its object is to reduce the burden of a viewer and to show a stereoscopic image in a more natural comfortable manner at the time of performing stereoscopic display by a stereoscopic display device.

Solution to Problem

The present invention has been made to solve the above problem, and a first aspect thereof is a disparity conversion device including a first image conversion unit configured to subject each of the left image and right image of an input image to first step image conversion; a second image conversion unit configured to subject each of the left image and right image subjected to the first step image conversion to second step image conversion to generate an output image; a disparity estimating unit configured to estimate disparity from the left image and right image of the input image to generate a disparity map that holds disparity for each pixel or each pixel group; a disparity analyzing unit configured to analyze the disparity map to generate a disparity control parameter so that the distribution of the disparity in the input image is included in a predetermined range; and a disparity control unit configured to control image conversion at the first and second image conversion units based on the disparity control parameter, and a disparity conversion method and a program thereof. This acts such that the distribution of disparity in an input image is included in a predetermined range according to image conversion of two steps.

Also, with this first aspect, the first image conversion unit may perform shift processing for shifting the relative positions of the left image and right image of the input image in the horizontal direction as the first step image conversion, and the second image conversion unit may perform scaling processing for performing enlargement/reduction with the centers of the left image and right image subjected to the first step image conversion as references. Also, the first image conversion unit may perform scaling processing for performing enlargement/reduction with the inner positions of the left image and right image of the input image as references, and the second image conversion unit may perform scaling processing for performing enlargement/reduction with the centers of the left image and right image subjected to the first step image conversion as references. Also, the first image conversion unit may perform scaling processing for performing enlargement/reduction with the outer positions of the left image and right image of the input image as references, and the second image conversion unit may perform scaling processing for performing enlargement/reduction with the centers of the left image and right image subjected to the first step image conversion as references. According to the image conversion of these two steps, this acts so as to show a stereoscopic image in a more natural comfortable manner.

Also, with this first aspect, the disparity analyzing unit may determine the disparity control parameter so that the total amount of predetermined stress values of the input image becomes the minimum. This acts such that disparity control is performed with a stress value as a reference.

Also, with this first aspect, the disparity conversion device may further include a region-of-interest estimating unit configured to estimate regions of interest in the left image and right image of the input image to generate a region-of-interest map illustrating the positions and degrees of interest in the input image; with the disparity analyzing unit generating the disparity control parameter in consideration of the region-of-interest map in addition to the disparity map. This acts such that disparity control is performed in consideration of the region-of-interest map.

Also, with this first aspect, the disparity conversion device may further include an image frame conversion unit configured to convert said output image so as to fill a region that is input to one eye alone of a viewer and protrudes nearer than a display surface in the peripheral region of the image frame of said output image. This acts such that an image is converted so as to fill an uncomfortable region around the image frame.

Also, a second aspect of the present invention is a disparity conversion device including a first image conversion unit configured to subject each of the left image and right image of an input image to first step image conversion; a second image conversion unit configured to subject each of the left image and right image subjected to the first step image conversion to second step image conversion to generate an output image; an operation acceptance unit configured to accept operation input relating to image conversion at the first and second image conversion units; and a disparity control unit configured to generate a disparity control parameter in accordance with the operation input, and to control image conversion at the first and second image conversion units based on the disparity control parameter, and a disparity conversion method and a program thereof. This acts such that the distribution of disparity in an input image is included in a predetermined range according to image conversion of two steps.

Also, with this second aspect, the operation acceptance unit may accept an abstraction disparity control parameter indicating a combination of preset disparity control parameters as the operation input. This acts such that specification of the disparity control parameter is facilitated.

Also, a third aspect of the present invention is a stereoscopic image display system including: an input image supply unit configured to supply an input image including a left image and a right image as a pair of stereoscopic images; a first image conversion unit configured to subject each of the left image and right image of the input image to first step image conversion; a second image conversion unit configured to subject each of the left image and right image subjected to the first step image conversion to second step image conversion to generate an output image; a disparity estimating unit configured to estimate disparity from the left image and right image of the input image to generate a disparity map that holds disparity for each pixel or each pixel group; a disparity analyzing unit configured to analyze the disparity map to generate a disparity control parameter so that the distribution of the disparity in the input image is included in a predetermined range; a disparity control unit configured to control image conversion at the first and second image conversion units based on the disparity control parameter; and an image display device configured to display the output image, and a display method and a program thereof. This acts such that the distribution of disparity in an input image is displayed included in a predetermined range according to image conversion of two steps.

Advantageous Effects of Invention

According to the present invention, at the time of performing stereoscopic display by a stereoscopic display device, an excellent advantage to reduce the burden of a viewer and to show a stereoscopic image in a more natural comfortable manner is yielded.

BRIEF DESCRIPTION OF DRAWINGS

FIG. 17 is a diagram illustrating modes of scaling processing with the frame outer side positions of the image conversion unit 250 according to an embodiment of the present invention as references.

FIG. 22 is a diagram illustrating an example of the recommended setting range of a disparity control parameter in the first embodiment of the present invention.

FIG. 23 is a diagram illustrating an example of an abstraction disparity control parameter in the first embodiment of the present invention.

FIGS. 25A and 25B are diagrams illustrating a relation example between shift processing and a disparity histogram, according to the second embodiment of the present invention.

FIGS. 26A and 26B are diagrams illustrating a relation example between scaling processing and a disparity histogram, according to the second embodiment of the present invention.

FIGS. 30A, 30B, 30C, and 30D are diagrams illustrating a specific example of disparity conversion processing according to the third embodiment of the present invention.

FIGS. 31A and 31B are diagrams illustrating a specific example between scaling disparity histogram, according to the third embodiment of the present invention.

FIGS. 34A and 34B are diagrams illustrating a state example before and after processing by an image frame conversion unit 280 according to the fourth embodiment of the present invention.

DESCRIPTION OF EMBODIMENTS

Hereafter, description will be made regarding modes for implementing the present invention (hereafter, referred to as embodiments). Description will be made in accordance with the following sequence.

1. First Embodiment (disparity control according to parameter specification)
2. Second Embodiment (disparity control based on disparity analysis)
3. Third Embodiment (disparity control in consideration of region of interest)
4. Fourth Embodiment (disparity control in consideration of around image frame)
5. Modifications <1. First Embodiment>

Configuration Example of Stereoscopic Image Display System

Figure 1:
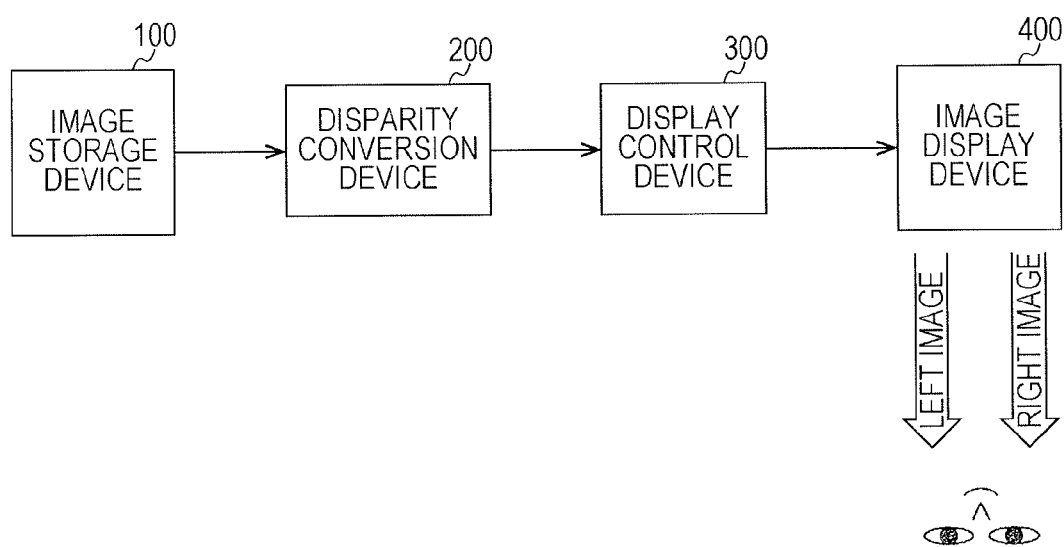
FIG. 1 is a diagram illustrating a configuration example of a stereoscopic image display system according to an embodiment of the present invention.

FIG. 1 is a diagram illustrating a configuration example of a stereoscopic image display system according to an embodiment of the present invention. This stereoscopic image display system includes an image storage device 100, a disparity conversion device 200, a display control device 300, and an image display device 400.

The image storage device 100 is a device configured to store image data for stereoscopic display. Here, the image data is a stereoscopic image with a left image to be perceived by the left eye of a person, and a right image to be perceived by the right eye of the person as a pair, may be a still image made up of a set of the left and right images, or may be a moving image where the left and right images (frames) are arrayed in the time sequence. Note that the image storage device 100 is an example of an input image supply unit described in the Claims.

The disparity conversion device 200 is a device configured to convert the disparity of a stereoscopic image in the image data stored in the image storage device 100. That is to say, the input and output of this disparity conversion device 200 are both stereoscopic images, and conversion is made so that disparities recognized by both eyes differ.

The display control device 300 is a device configured to effect control to display the image data output from the disparity conversion device 200 on the image display device 400. The image display device 400 is a stereoscopic display configured to display the image data as a stereoscopic image. As for a stereoscopic display method, an arbitrary method may be applied such as a method for alternately disposing the left and right images for each scanning line, a method for displaying the left and right images in chronological order, or the like. The display control device 300 performs display control so as to handle the display method of the image display device 400.

Configuration Example of Disparity Conversion Device

Figure 2:
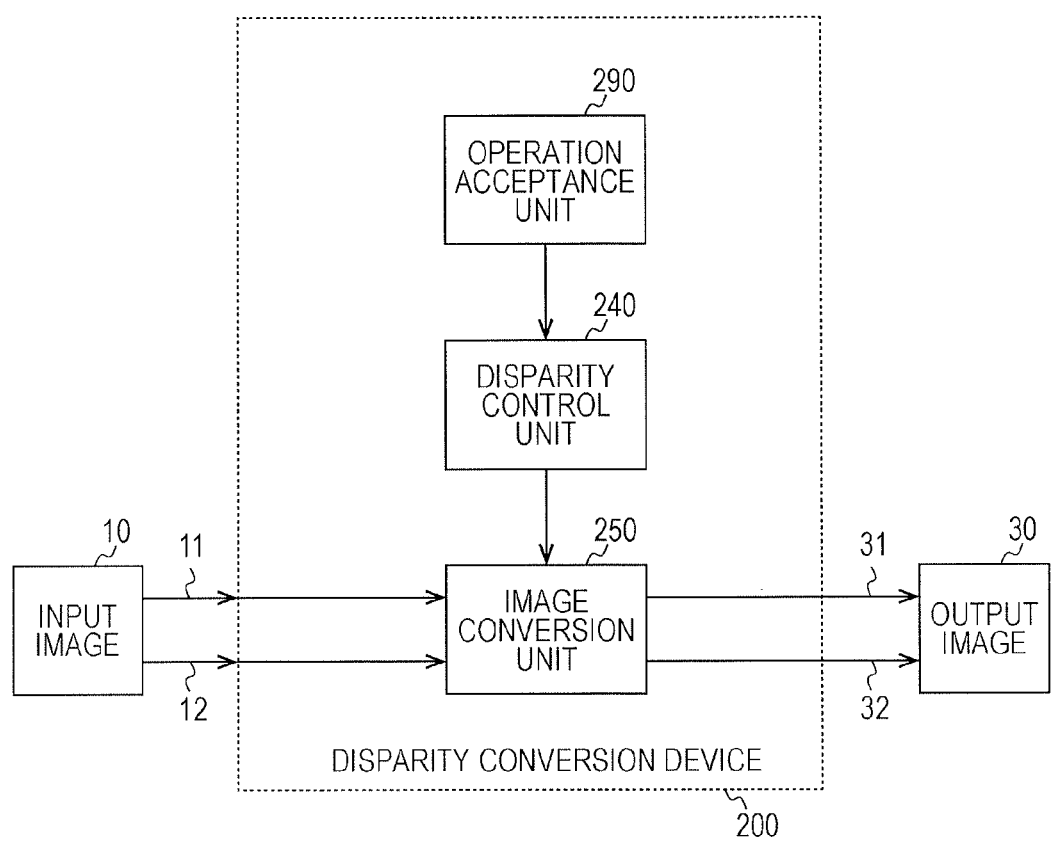
FIG. 2 is a diagram illustrating a configuration example of a disparity conversion device 200 according to a first embodiment of the present invention.

FIG. 2 is a diagram illustrating a configuration example of the disparity conversion device 200 according to the first embodiment of the present invention. This disparity conversion device 200 is a device configured to receive a stereoscopic image made up of a left image 11 and a right image 12 as an input image 10, convert disparity thereof, and to output a stereoscopic image made up of a left image 31 and a right image 32 as an output image 30. This disparity conversion device 200 includes an operation acceptance unit 290, a disparity control unit 240, and an image conversion unit 250.

The operation acceptance unit 290 is a user interface configured to accept operation input from a user. As for operation input, a later-described disparity control parameter may directly be input, or a parameter abstracted in accordance with a fixed rule may be input.

The disparity control unit 240 is a unit configured to control the processing content at the image conversion unit 250 based on the operation input accepted by the operation acceptance unit 290, thereby controlling the disparity of the input image 10.

The image conversion unit 250 subjects the input image 10 to image conversion based on the control by the disparity control unit 240 to output an output image 30. As for the image conversion at the image conversion unit 250, processing of two steps is performed as to each of the left and right images, which will be described later.

Configuration Example of Image Conversion Unit

Figure 3:
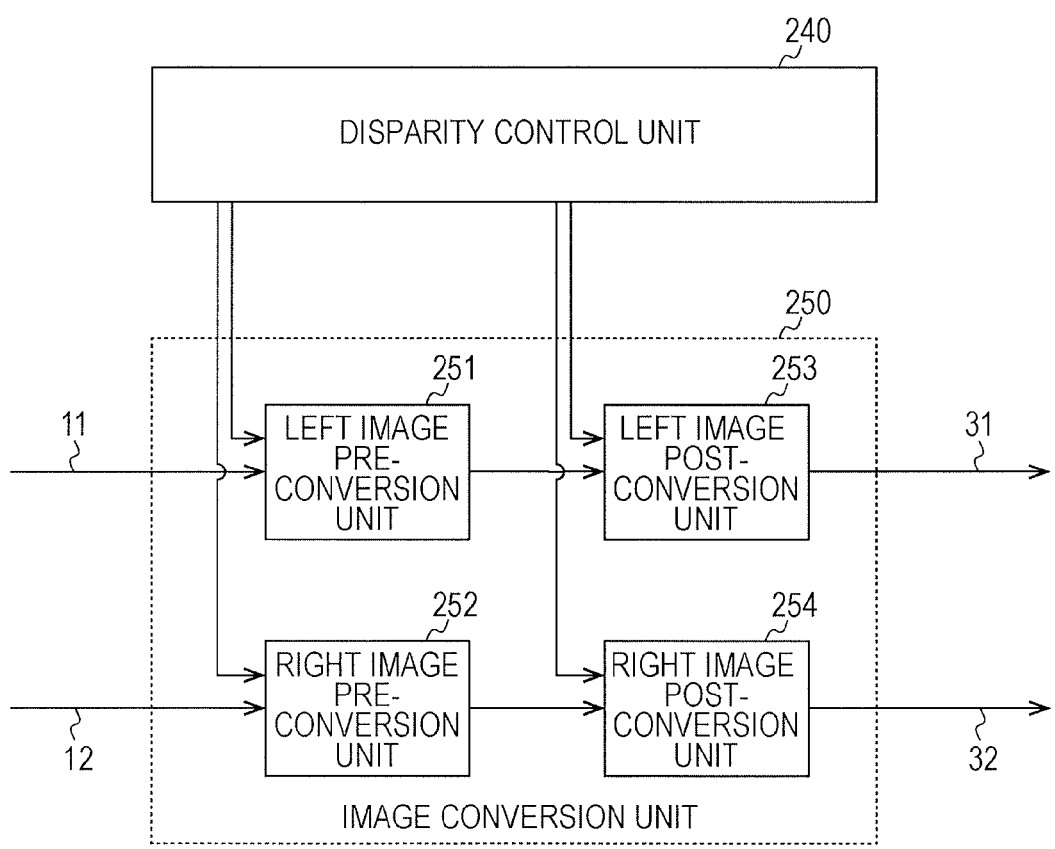
FIG. 3 is a diagram illustrating a configuration example of an image conversion unit 250 according to an embodiment of the present invention.

FIG. 3 is a diagram illustrating a configuration example of the image conversion unit 250 according to an embodiment of the present invention. This image conversion unit 250 includes a left image pre-conversion unit 251, a right image pre-conversion unit 252, a left image post-conversion unit 253, and a right image post-conversion unit 254.

The left image pre-conversion unit 251 is a unit configured to subject the left image 11 to first step image conversion. The right image pre-conversion unit 252 is a unit configured to subject the right image 12 to first step image conversion. The left image post-conversion unit 253 is a unit configured to subject the left image 11 to second step image conversion. The right image post-conversion unit 254 is a unit configured to subject the right image 12 to second step image conversion. These left image pre-conversion unit 251, right image pre-conversion unit 252, left image post-conversion unit 253, and right image post-conversion unit 254 are each configured so as to be independently controlled by the disparity control unit 240. Note that the left image pre-conversion unit 251 and right image pre-conversion unit 252 are examples of the first image conversion unit described in the Claims. Also, the left image post-conversion unit 253 and right image post-conversion unit 254 are examples of the second image conversion unit described in the Claims.

As for the first step image conversion at the image conversion unit 250, shift processing for moving the left and right images is assumed to be used, which will be described later. However, instead of this shift processing, scaling processing for enlarging/reducing the entire screen in the horizontal direction with the edges of the left and right images as references may be employed. Also, as for the second step image conversion at the image conversion unit 250, scaling processing for enlarging/reducing the entire screen is assumed to be used with the centers of the left and right images as references, which will be described later. More natural stereoscopic effect can be reproduced by performing such image conversion of two steps regarding each of the left and right images.

The image conversion at this image conversion unit 250 is generalized as follows. Now, let us say that the pixel of coordinates (x, y) is p(x, y), the pixels of interest on the left and right images are p(xL, yL) and p(xR, yR), and the pixels on the left and right images after disparity control are p(x'L, y'L) and p(x'R, y'R).

$$\begin{pmatrix} x'_L & x'_R \\ y'_L & y'_R \end{pmatrix} = \begin{pmatrix} r & 0 \\ 0 & 1 \end{pmatrix} \begin{pmatrix} x_L - x_{L0} & x_R - x_{R0} \\ y_L & y_R \end{pmatrix} + \begin{pmatrix} x_{L1} & x_{R1} \\ 0 & 0 \end{pmatrix}$$

[Mathematical Expression 1]

Here, (xLi, yLi) and (xRi, yRi) are offset terms of the left and right images, respectively (where i is 0 or 1).

The shift processing for shifting the relative positions of the left and right images in the horizontal direction is defined by the following expression from the above general expression.

$$\begin{pmatrix} x'_L & x'_R \\ y'_L & y'_R \end{pmatrix} = \begin{pmatrix} x_L - \frac{s}{2} & x_R + \frac{s}{2} \\ y_L & y_R \end{pmatrix}$$

[Mathematical Expression 2]

At this time, the disparity control parameter is shift amount s.

Also, the scaling processing for enlarging/reducing the entire screen in the horizontal direction with the centers of the left and right images as references is defined by the following expression.

$$\begin{pmatrix} x'_L & x'_R \\ y'_L & y'_R \end{pmatrix} = \begin{pmatrix} r & 0 \\ 0 & 1 \end{pmatrix} \begin{pmatrix} x_L - x_{LC} & x_R - x_{RC} \\ y_L & y_R \end{pmatrix} + \begin{pmatrix} x_{LC} & x_{RC} \\ 0 & 0 \end{pmatrix}$$

[Mathematical Expression 3]

At this time, the disparity control parameters are a scaling ratio r, the horizontal coordinates xLC of the center of the left image, and the horizontal coordinates xRC of the center of the right image.

Also, the scaling processing for enlarging/reducing the entire screen in the horizontal direction with the frame inner side positions as references is defined by the following expression.

$$\begin{pmatrix} x'_L & x'_R \\ y'_L & y'_R \end{pmatrix} = \begin{pmatrix} r & 0 \\ 0 & 1 \end{pmatrix} \begin{pmatrix} x_L - x_{LR} & x_R - x_{RL} \\ y_L & y_R \end{pmatrix} + \begin{pmatrix} x_{LR} & x_{RL} \\ 0 & 0 \end{pmatrix}$$

[Mathematical Expression 4]

At this time, the disparity control parameters are a scaling ratio r, the horizontal coordinates xLR of the right edge of the left image, and the horizontal coordinates xRL of the left edge of the right image.

Also, the scaling processing for enlarging/reducing the entire screen in the horizontal direction with the frame outer side positions as references is defined by the following expression.

$$\begin{pmatrix} x'_L & x'_R \\ y'_L & y'_R \end{pmatrix} = \begin{pmatrix} r & 0 \\ 0 & 1 \end{pmatrix} \begin{pmatrix} x_L - x_{LL} & x_R - x_{RR} \\ y_L & y_R \end{pmatrix} + \begin{pmatrix} x_{LL} & x_{RR} \\ 0 & 0 \end{pmatrix}$$

[Mathematical Expression 5]

At this time, the disparity control parameters are a scaling ratio r, the horizontal coordinates xLL of the left edge of the left image, and the horizontal coordinates xRR of the right edge of the right image.

Relationship between Disparity and Stereoscopic Image

Figure 4:
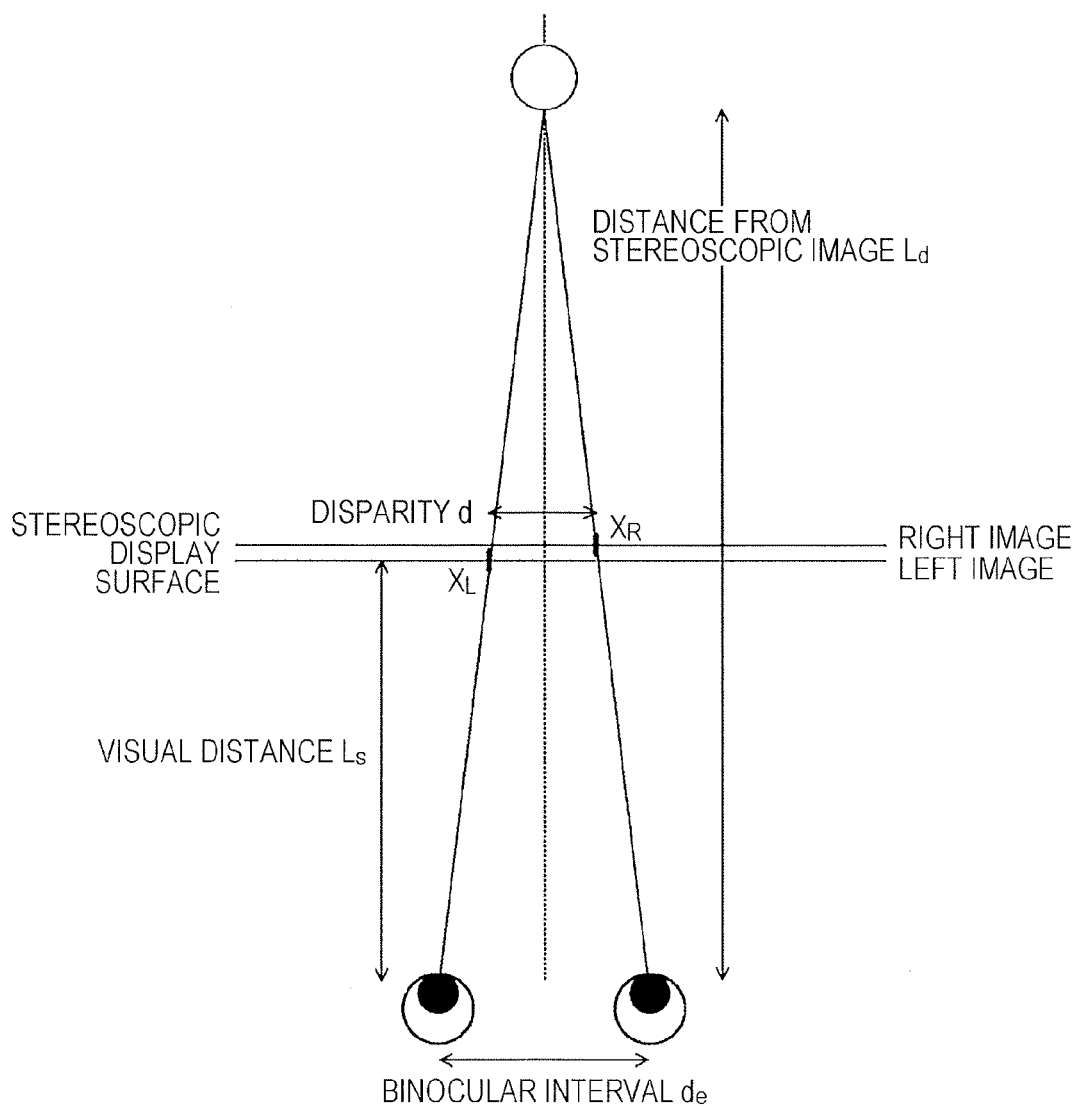
FIG. 4 is a diagram for describing relationship between disparity and distance to a stereoscopic image.

FIG. 4 is a diagram for describing relationship between disparity and distance to a stereoscopic image. In this drawing, the interval between the left and right eyes is taken as a binocular interval de, distance from the center between the left and right eyes to the display surface of the stereoscopic display is taken as visual distance Ls, distance from the centers of the left and right eyes to the stereoscopic image is taken as stereoscopic image distance Ld, the horizontal coordinate on the display surface of the left image is taken as XL, and the horizontal coordinate on the display surface of the right image is taken as XR. At this time, disparity d is defined as relative distance between XL and XR.

$$d = XR - XL$$

That is to say, in the event that the stereoscopic image exists deeper than the display surface of the stereoscopic display, the disparity d has a positive value, and in the event that the stereoscopic image exists nearer than the display surface of the stereoscopic display, the disparity d has a negative value.

Also, in this drawing, $$Ld:Ls=de:(de-d)$$

holds. The binocular interval de is 6.5 [cm] or so, and in the usual case, the Ls is thought as 1.5 through 1.7 [m] or so, whereby these can be realized as fixed values. Thus, it can be understood that relationship between the disparity d and the stereoscopic image distance Ld is represented by the following expression, and stereoscopic effect (stereoscopic image distance Ld) changes depending on the disparity d.

$$Ld=Ls\cdot de/(de-d)$$

Image Conversion by Shift Processing

Figure 5:
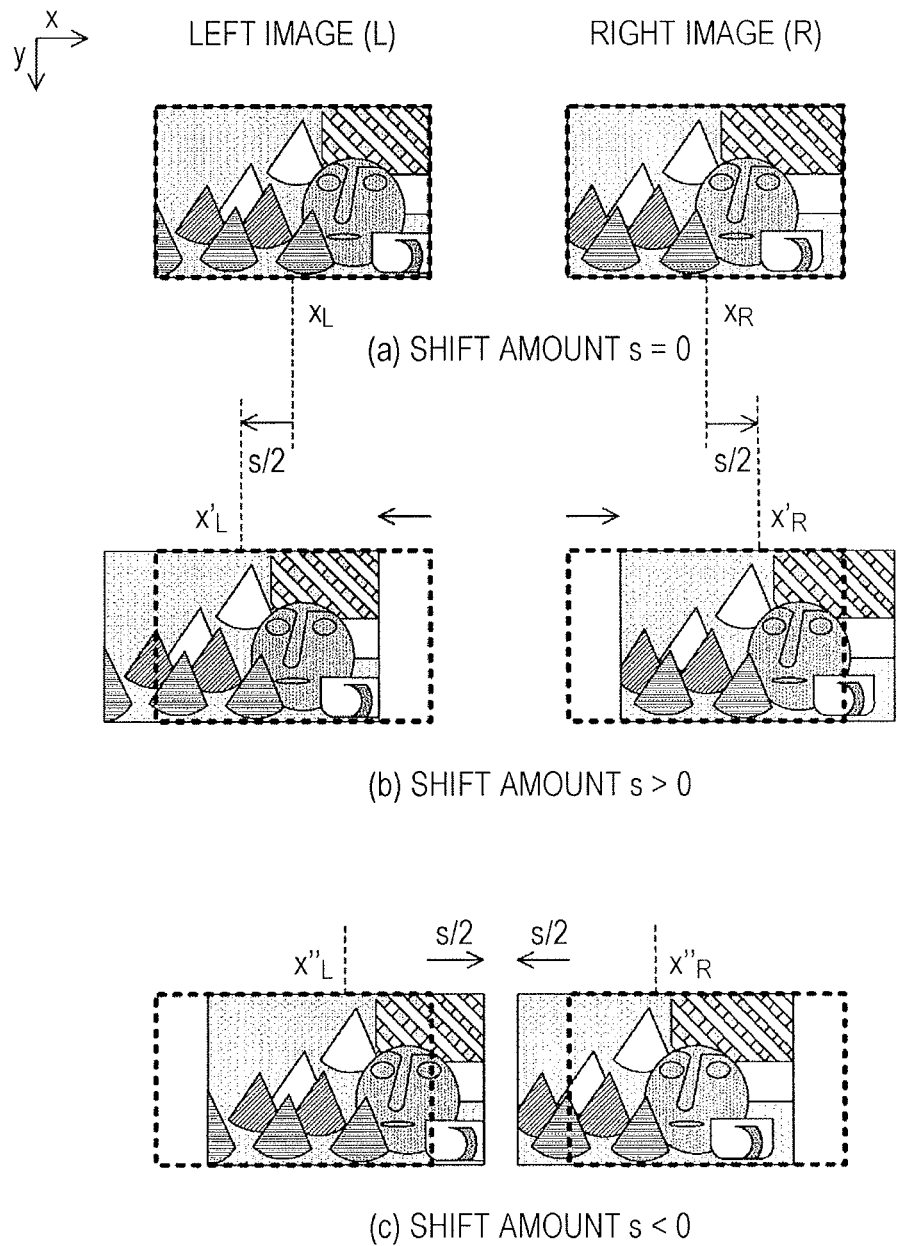
FIG. 5 is a diagram illustrating modes of shift processing at the image conversion unit 250 according to an embodiment of the present invention.

FIG. 5 is a diagram illustrating the modes of the shift processing at the image conversion unit 250 according to an embodiment of the present invention. (a) in FIG. 5 is the left and right images in a state in which shift amount s=0, i.e., no shift processing has been performed. The coordinate of the pixel of interest in the horizontal (x) direction of the left image is taken as xL, and the coordinate of the pixel of interest in the horizontal direction of the right image is taken as xR.

(b) in FIG. 5 is a diagram illustrating a state in which the shift amount s>0, i.e., the shift processing has been performed in a direction where the left and right images recede from each other. The left image is shifted s/2 pixels in the left direction so that the coordinate of the pixel of interest in the horizontal direction of the left image is changed from the xL to x'L. On the other hand, the right image is shifted s/2 pixels in the right direction so that the coordinate of the pixel of interest in the horizontal direction of the right image is changed from the xR to x'R. That is to say, each of the left and right images is shifted s/2 pixels at a time, i.e., s pixels in total.

(c) in FIG. 5 is a diagram illustrating a state in which the shift amount s<0, i.e., the shift processing has been performed in a direction where the left and right images approach to each other. The left image is shifted s/2 pixels in the right direction so that the coordinate of the pixel of interest in the horizontal direction of the left image is changed from the xL to x"L. On the other hand, the right image is shifted s/2 pixels in the left direction so that the coordinate of the pixel of interest in the horizontal direction of the right image is changed from the xR to x""R. That is to say, each of the left and right images is shifted s/2 pixels at a time, i.e., s pixels in total.

If we say that the pixel of the coordinates (x, y) is taken as p(x, y), and the pixels of interest on the left and right images are taken as p(xL, yL) and p(xR, yR), pixels p(x'L, y'L) and p(x'R, y'R) on the left and right images after disparity control according to the shift amount s become as follows, respectively.

$$p(x'L,y'L)=p(xL-s/2,yL)$$

$$p(x'R,y'R)=p(xR+s/2,yR)$$

Figure 6:
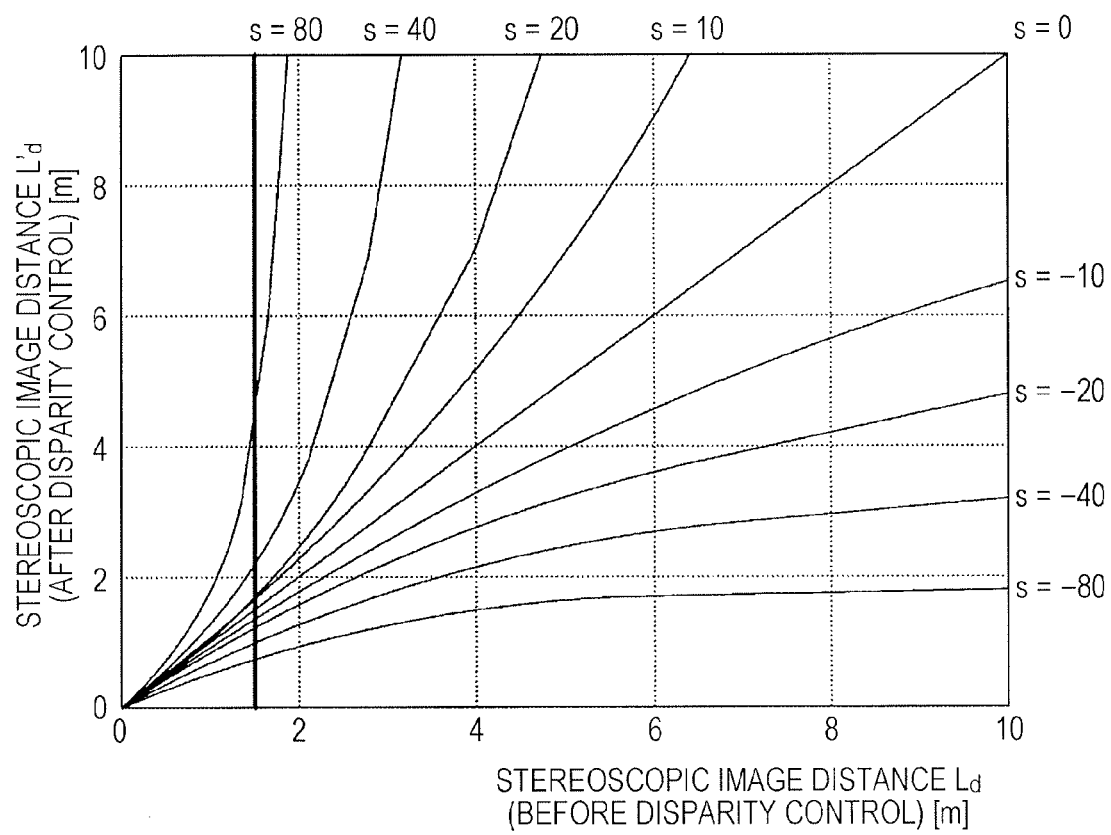
FIG. 6 is a graph illustrating relationship change in stereoscopic image distance before and after the shift processing according to an embodiment of the present invention.

FIG. 6 is a graph illustrating relationship of change in stereoscopic image distance before and after the shift processing according to an embodiment of the present invention. A vertical thick line indicates a position of the display surface of the stereoscopic display, and 1.5 [m] is assumed here.

In the event that the shift processing has been performed with the shift amount s, the disparity is changed to d+s, and accordingly, the stereoscopic image distance L'd after shift processing is as the following expression.

$$L'd=Ls\cdot de/(de-(d+s))$$

That is to say, in the event that the shift processing has been performed in a direction where the left and right images recede from each other (s>0), the stereoscopic image is perceived to have moved deeper. At this time, the stereoscopic image is perceived such that the more the shift amount increases, the deeper the stereoscopic image moves, and the deeper the stereoscopic image exists, the deeper the stereoscopic image moves. On the other hand, in the event that the shift processing has been performed in a direction where the left and right images approach to each other (s<0), the stereoscopic image is perceived to have moved nearer. At this time, the stereoscopic image is perceived such that the more the absolute value of the shift amount increases, the nearer the stereoscopic image moves, and the deeper the stereoscopic image exists, the nearer the stereoscopic image moves.

Figure 7:
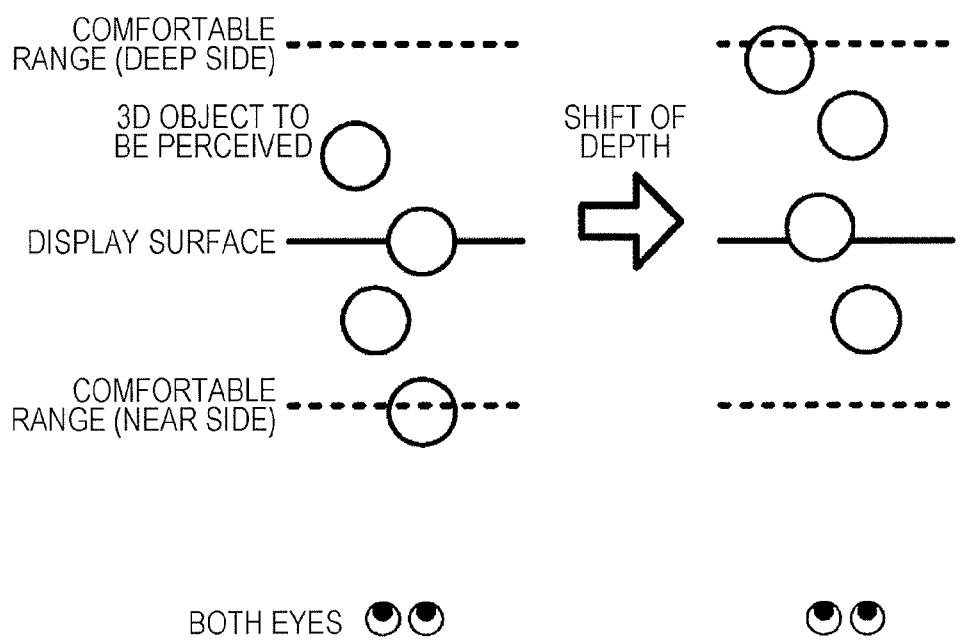
FIG. 7 is a diagram illustrating an example of change in stereoscopic effect according to the shift processing according to an embodiment of the present invention.

FIG. 7 is a diagram illustrating an example of change in stereoscopic effect by the shift processing according to an embodiment of the present invention. With this example, the shift processing is performed in a direction where the left and right images recede from each other, and a stereoscopic image that protrudes extremely can be moved deeper. However, there is a case where stereoscopic effect that originally exists deeper moves deeper extremely, and in such a case, it is desirable to adjust the stereoscopic image by second step image conversion.

Figure 8:
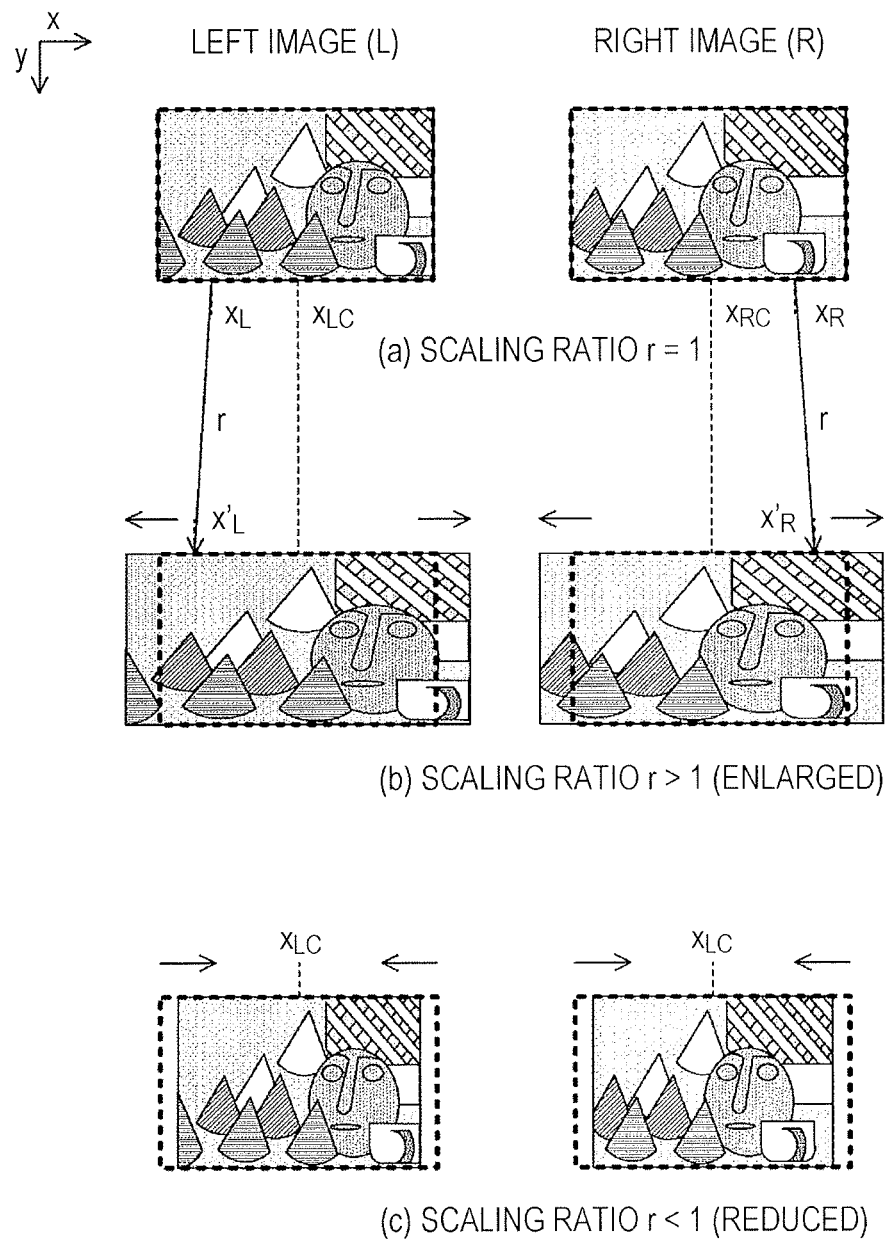
FIG. 8 is a diagram illustrating modes of scaling processing with the frame center positions of the image conversion unit 250 according to an embodiment of the present invention as references.

Image Conversion by Scaling Processing with Frame Center Positions as References FIG. 8 is a diagram illustrating the modes of scaling processing with the frame center positions as references at the image conversion unit 250 according to an embodiment of the present invention. (a) in FIG. 8 is the left and right images in a state in which the scaling ratio r=1, i.e., no scaling processing has been performed. The coordinate of the pixel of interest in the horizontal (x) direction of the left image is taken as xL, and the center coordinate is taken as xLC. Also, the coordinate of the pixel of interest in the horizontal direction of the right image is taken as xR, and the center coordinate is taken as xRC.

(b) in FIG. 8 is a diagram illustrating a state in which the scaling ratio r>1, i.e., the entire screen has been subjected to enlargement processing in the horizontal direction with the center coordinates xLC and xRC of the left and right images as references. At this time, the entire screen is enlarged so that the horizontal coordinate of the pixel of interest of the left image is changed from the xL to x'L. Similarly, the entire screen is enlarged so that the horizontal coordinate of the pixel of interest of the right image is changed from the xR to x'R.

(c) in FIG. 8 is a diagram illustrating a state in which the scaling ratio r<1, i.e., the entire screen has been subjected to reduction processing in the horizontal direction with the center coordinates of the left and right images as references. At this time, the image frame is in a state in which the original image does not exist, and accordingly, processing for inserting an image, such as black or white or the like, is performed.

If we say that the pixel of the coordinates (x, y) is taken as p(x, y), and the pixels of interest on the left and right images are taken as p(xL, yL) and p(xR, yR), pixels p(x'L, y'L) and p(x'R, y'R) on the left and right images after disparity control by the scaling ratio r are as follows, respectively.

$$p(x'L, y'L) = p(r(xL-xLC)+xLC, yL)$$

$$p(x'R, y'R) = p(r(xR-xRC)+xRC, yR)$$

Figure 9:
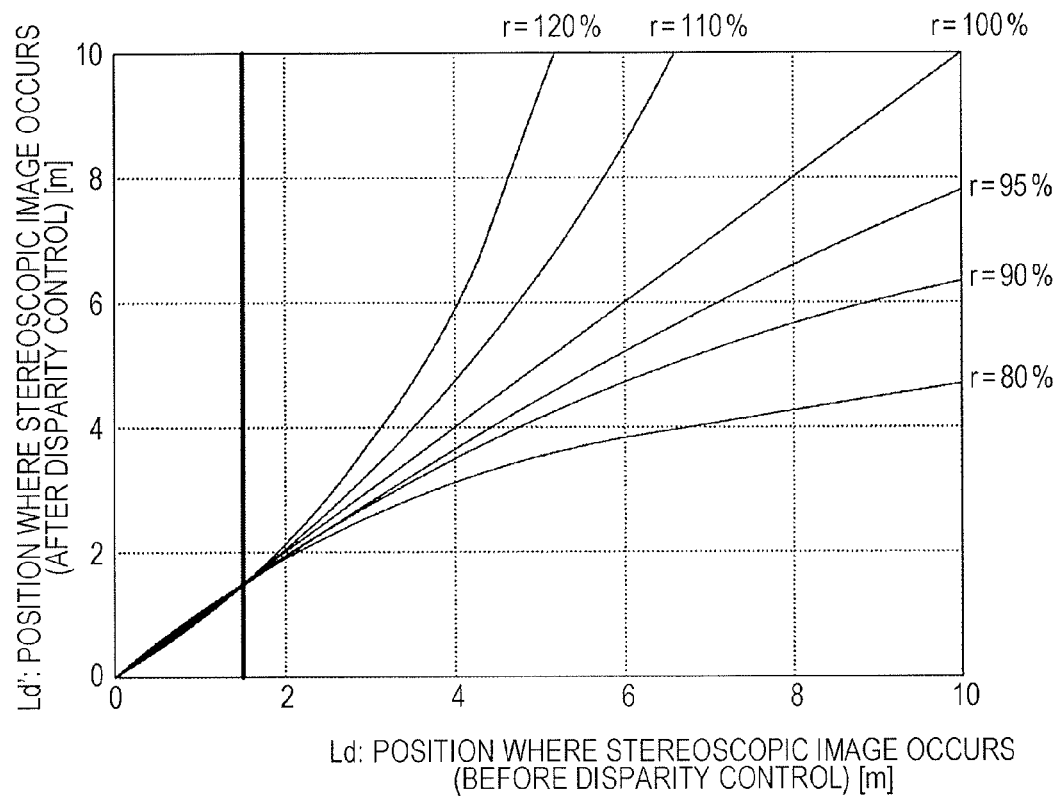
FIG. 9 is a graph illustrating relationship of change in stereoscopic image distance before and after the scaling processing with the frame center positions according to an embodiment of the present invention as references.

FIG. 9 is a graph illustrating relationship of change in stereoscopic image distance before and after the scaling processing with the frame center positions as references according an embodiment of the present invention. A vertical thick line indicates a position of the display surface of the stereoscopic display, and 1.5 [m] is assumed here.

In the event that the scaling processing has been performed with the scaling ratio r, the disparity changes to r×d, and accordingly, stereoscopic image distance L'd after shift processing is as in the following expression.

$$L'd = Ls \cdot de/(de - r \cdot d)$$

That is to say, in the event that the reduction processing has been performed (r<1), the stereoscopic image is perceived such that the dynamic range of depth is reduced, the stereoscopic image deeper than the position of the display surface of the stereoscopic display moves nearer, and the stereoscopic image nearer than the position of the display surface of the stereoscopic display moves deeper. On the other hand, in the event that the enlargement processing has been performed (r>1), the stereoscopic image is perceived such that the dynamic range of depth is enlarged, the stereoscopic image deeper than the position of the display surface of the stereoscopic display moves deeper, and the stereoscopic image nearer than the position of the display surface of the stereoscopic display moves nearer.

Figure 10:
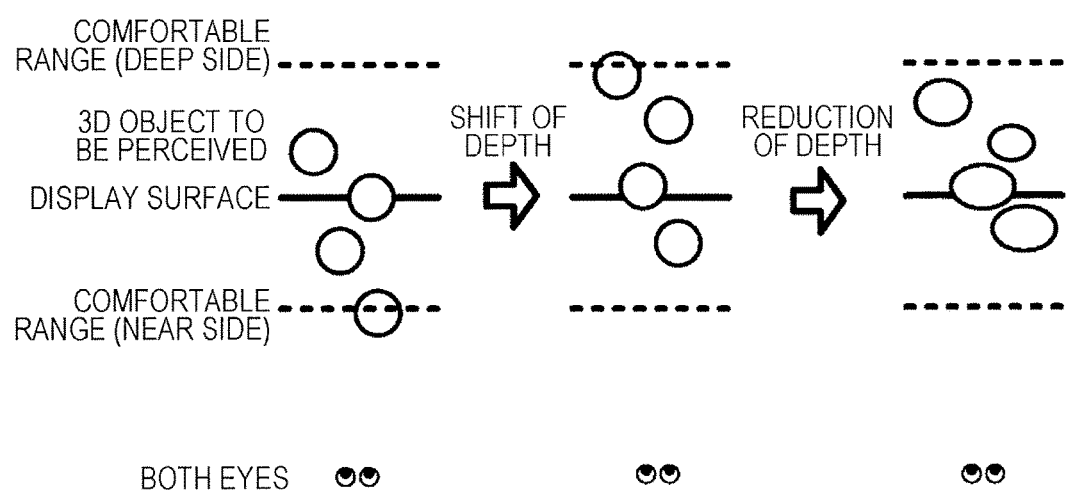
FIG. 10 is a diagram illustrating an example of change in stereoscopic effect by a combination between the shift processing and the scaling processing, according to an embodiment of the present invention.

FIG. 10 is a diagram illustrating an example of change in stereoscopic effect using a combination between the shift processing and scaling processing according to an embodiment of the present invention. With this example, after the shift processing is performed in a direction where the left and right images recede to each other, the scaling processing of reduction is performed, and after the stereoscopic image that protrudes extremely is moved deeper, adjustment by reduction is performed as the second step image conversion so that the stereoscopic image is fitted into a further comfortable range.

Comfortable Range of Stereopsis

Figure 11:
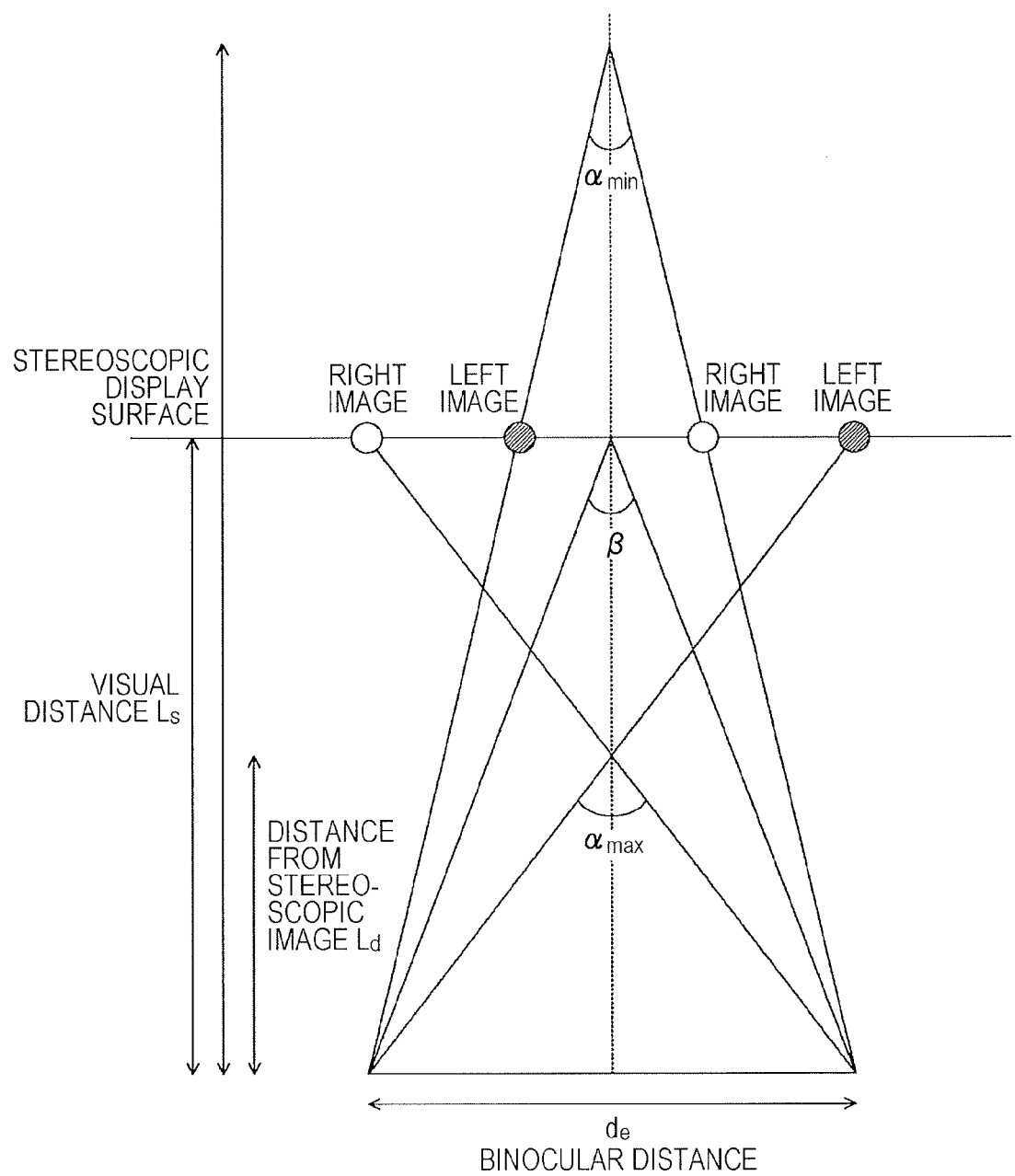
FIG. 11 is a diagram for describing a comfortable range of stereopsis.

FIG. 11 is a diagram for describing a comfortable range of stereopsis. The binocular interval de, visual distance Ls, and stereoscopic image distance Ld are denoted with the same symbols as with those in FIG. 4. Now, let us consider that the disparity angle of ±1° from the disparity angle on the display surface of the stereoscopic display is a comfortable range, with reference to "3DC Safety Guidelines" by 3D Consortium Safety Guidelines Section (revised on Dec. 10, 2008). At this time, if we represent that the disparity angle on the display surface of the stereoscopic display is taken as a disparity angle β, and the disparity angle of ±1° as to β is taken as α, $$|\alpha - \beta| \le 1° (=\pi/180)$$

$$\alpha = \beta \pm (\pi/180)$$

hold.

Here, relationship between the visual distance Ls and β is $$(de/2)/Ls = \tan(\beta/2)$$

$$\beta = 2 \tan^{-1}(de/(2Ls)).$$

Also, relationship between the stereoscopic image distance Ld and α is $$Ld = de/2 \tan(\alpha/2),$$

and accordingly, the range in the depth direction whereby viewing can comfortably be performed is as follows.

$$de/2 \tan(\alpha max/2) \text{ through } de/2 \tan(\alpha min/2)$$

where $$\alpha max = \beta + \pi/180$$

$$\alpha min = \beta - \pi/180$$

hold.

Disparity Control by Two Step Image Conversion

Figure 12:
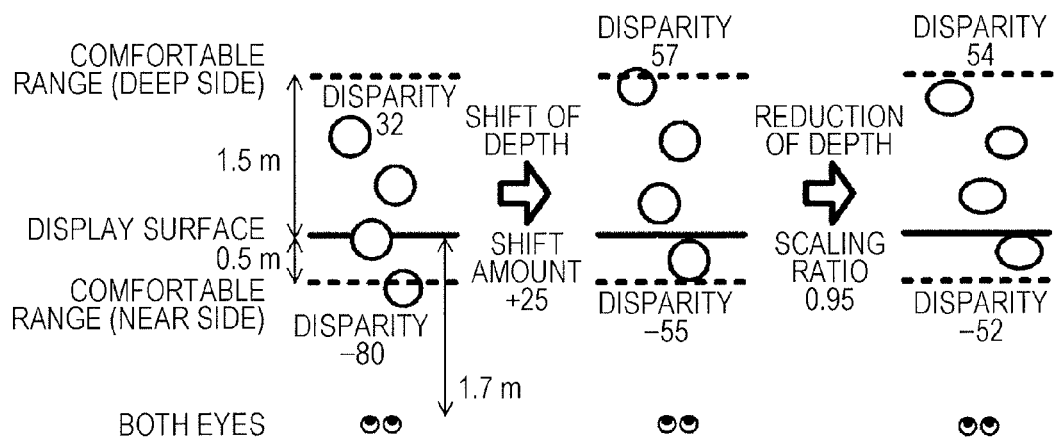
FIG. 12 is a diagram illustrating an example of adjustment of stereoscopic effect by a combination between the shift processing and the scaling processing, according to an embodiment of the present invention.

FIG. 12 is a diagram illustrating an example of adjustment of stereoscopic effect using a combination of the shift processing and scaling processing according to an embodiment of the present invention. The range where viewing can comfortably be performed at a 46-V television set is, with standard visual distance 3 H, i.e., 1.7 [m], conceived as a range from 0.5 [m] on the near side of the display surface of the display to 1.5 [m] on the deep side. In terms of disparity, this is a range of −56 pixel to +55 pixel.

With this example, let us assume that the stereoscopic image exists in a rage from −80 pixel to +32 pixel as disparity. First, upon the shift processing of 25 pixels in the depth direction as the first step image conversion, the stereoscopic image moves in a range of −55 pixel to +57 pixel as disparity. In this case, the stereoscopic image is in a state somewhat protruding from the comfortable range at the depth portion. Therefore, the scaling processing of 0.95 [times] in the horizontal direction is performed as the second step image conversion. This scaling processing is performed, as described above, with the frame center positions as references. Thus, the stereoscopic image is in a range of −52 pixel to +54 pixel as disparity, whereby it can be understood that the disparity is included in the above comfortable range.

Figure 13:
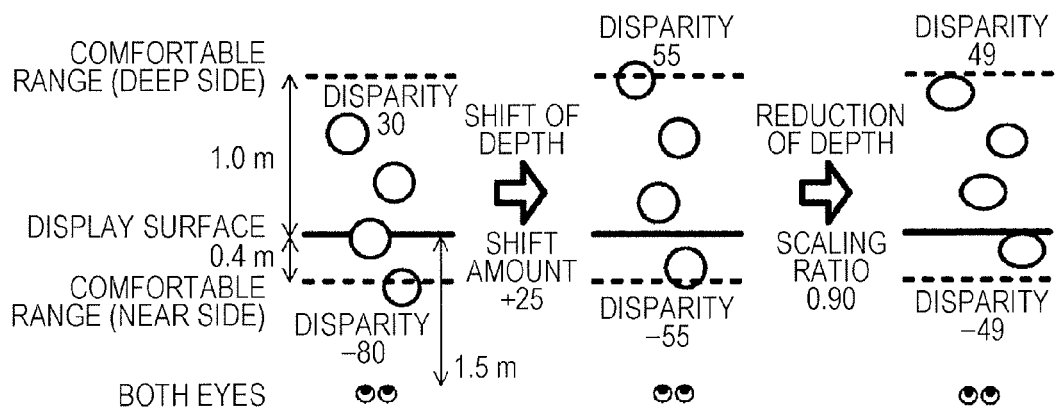
FIG. 13 is a diagram illustrating another example of adjustment of stereoscopic effect by a combination between the shift processing and the scaling processing, according to an embodiment of the present invention.

FIG. 13 is a diagram illustrating another example of adjustment of stereoscopic effect using a combination of the shift processing and scaling processing according to an embodiment of the present invention. In the event that visual distance is taken as 1.5 [m], it can be conceived that a range where viewing can comfortably be performed at the 46-V television set is a range from 0.4 [m] on the near side of the display surface of the display to 1.0 [m] on the deep side. Upon replacing this with disparity, this range is in a range from −49 pixel to +49 pixel.

With this example as well, let us say that the stereoscopic image exists in a range from −80 pixel to +32 pixel as disparity. First, in the same way as with the example in FIG. 12, upon the shift processing of 25 pixels in the depth direction being performed as the first step image conversion, the stereoscopic image moves in a range from −55 pixel to +57 pixel as disparity. In this case, the stereoscopic image is in a state somewhat protruding from the comfortable range at both of nearer and deeper portions. Therefore, scaling processing of 0.90 [times] in the horizontal direction is performed as the second step image conversion. This scaling processing is processing with the frame center positions as references, as described above. Thus, the stereoscopic image is in a range from −49 pixel to +49 pixel as disparity, whereby it can be understood that this is included in the above comfortable range.

In this way, the shift processing is performed as the first step image conversion, and the scaling processing with the frame center positions as references is performed as the second step image conversion, whereby the stereoscopic image can be included in a range where comfortable viewing can be performed while suppressing side effects by the image conversions.

In this case, if we say that the sift amount of the first step image conversion is s, and the scaling ratio of the second step image conversion is r1, pixels p(x"L, y"L) and p(x"R, y"R) on the left and right images in the event of applying both are as follows, respectively.

$$p(x''L, y''L) = p(r1(xL - s/2 - xLC) + xLC, yL)$$

$$p(x''R, y''R) = p(r1(xR + s/2 - xRC) + xRC, yR)$$

The coordinate conversions of scaling of multiple steps may be executed together by the above expressions, and also may be executed by dividing these into two steps.

Processing Procedure of Disparity Conversion

Figure 14:
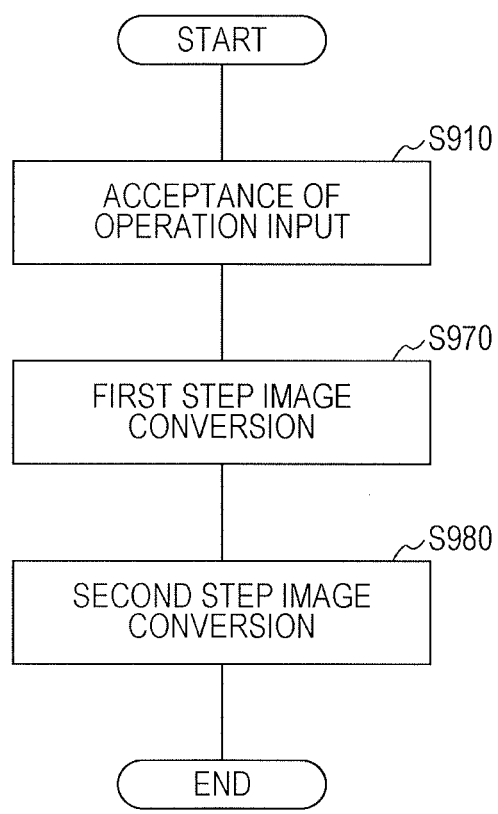
FIG. 14 is a flowchart illustrating a procedure example of disparity conversion processing according to the first embodiment of the present invention.

FIG. 14 is a flowchart illustrating a procedure example of disparity conversion processing according to the first embodiment of the present invention. First, the operation acceptance unit 290 accepts operation input from the user (step S910). In accordance with the accepted operation input, the disparity control unit 240 performs control as to the image conversion unit 250. With the image conversion unit 250, the first step image conversion is performed at the left image pre-conversion unit 251 and right image pre-conversion unit 252 (step S970). Subsequently, the second step image conversion is performed at the left image post-conversion unit 253 and right image post-conversion unit 254 (step S980).

With the above embodiment, though description has been made assuming the shift processing as the first step image conversion, scaling processing with the frame inner side or outer side positions as references may be employed instead of the shift processing. Hereafter, the scaling processing with the frame inner side or outer side positions as references will be described.

Figure 15:
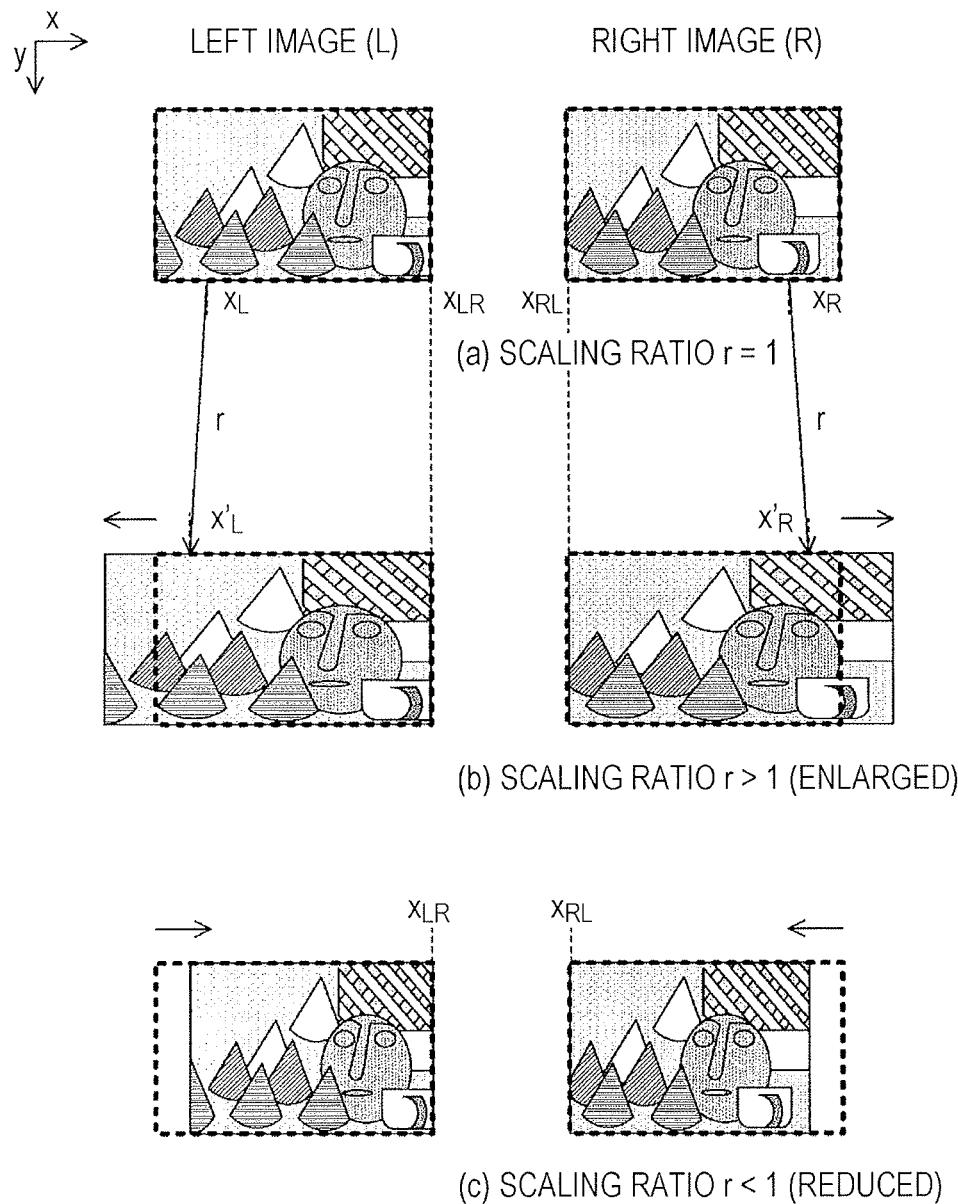
FIG. 15 is a diagram illustrating modes of scaling processing with the frame inner side positions of the image conversion unit 250 according to an embodiment of the present invention as references.

Image Conversion by Scaling Processing with Frame Inner Side Positions as References FIG. 15 is a diagram illustrating the modes of the scaling processing with the frame inner side positions as references at the image conversion unit 250 according to an embodiment of the present invention. (a) in FIG. 15 is the left and right images in a state in which the scaling ratio r=1, i.e., no scaling processing has been performed. The coordinate of the pixel of interest in the horizontal (x) direction of the left image is taken as xL, and the right edge coordinate is taken as xLR. Also, the coordinate of the pixel of interest in the horizontal direction of the right image is taken as xR, and the left edge coordinate is taken as xRL.

(b) in FIG. 15 is a diagram illustrating a state in which the scaling ratio r>1, i.e., the entire screen is subjected to enlargement processing in the horizontal direction with each of the frame inner positions of the left and right images as a reference. At this time, the entire screen is enlarged so that the coordinate of the pixel of interest in the horizontal direction of the left image is changed from the xL to x'L. Similarly, the entire screen is enlarged so that the coordinate of the pixel of interest in the horizontal direction of the right image is changed from the xR to x'R. There is no change regarding the right edge coordinate xLR of the left image, and the left edge coordinate xRL of the right image, serving as the reference positions of the left and right images.

(c) in FIG. 15 is a diagram illustrating a state in which the scaling ratio r<1, i.e., the entire screen is subjected to reduction processing in the horizontal direction with the frame inner positions of the left and right images as references. At this time, the entire screen is in a state in which there is no original image on the image frame portion, and accordingly, processing for inserting an image, such as black or white or the like, is performed. There is no change regarding the right edge coordinate xLR of the left image, and the left edge coordinate xRL of the right image, serving as the reference positions of the left and right images.

If we say that the pixel of the coordinates (x, y) is taken as p(x, y), and the pixels of interest on the left and right images are taken as p(xL, yL) and p(xR, yR), pixels p(x'L, y'L) and p(x'R, y'R) on the left and right images after disparity control according to the scaling ratio r become as follows, respectively.

$$p(x'L, y'L) = p(r(xL - xLR) + xLR, yL)$$

$$p(x'R, y'R) = p(r(xR - xRL) + xRL, yR)$$

Figure 16:
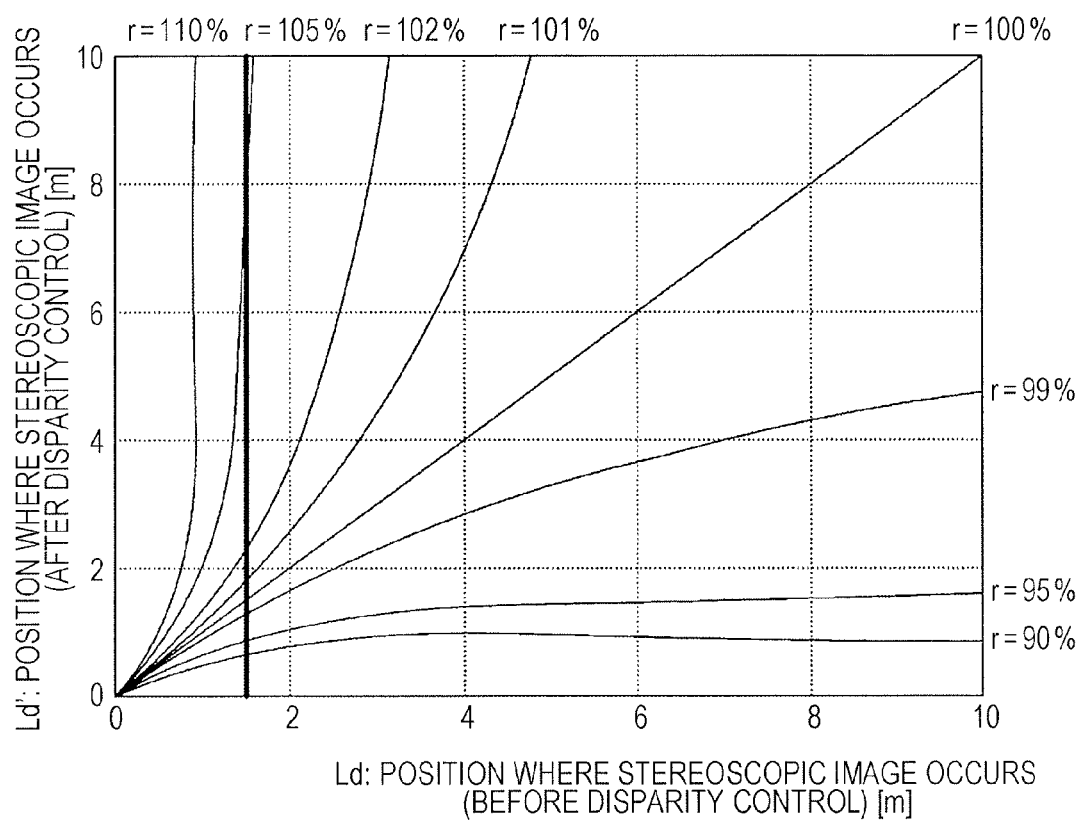
FIG. 16 is a graph illustrating relationship of change in stereoscopic image distance before and after the scaling processing with the frame inner side positions of the image conversion unit 250 according to an embodiment of the present invention as references.

FIG. 16 is a graph illustrating relationship of change in stereoscopic image distance before and after the scaling processing with the frame inner side positions as references, according to an embodiment of the present invention. A vertical thick line indicates a position of the display surface of the stereoscopic display, and 1.5 [m] is assumed here.

In the event that the reduction processing has been performed (r<1), the stereoscopic image is perceived such that the stereoscopic image moves nearer. At this time, the stereoscopic image is perceived such that the smaller the scaling ratio becomes, the nearer the stereoscopic image moves, and the deeper the stereoscopic image exists, the nearer the stereoscopic image moves. On the other hand, in the event that the enlargement processing has been performed (r>1), the stereoscopic image is perceived such that the stereoscopic image has moved deeper. At this time, the stereoscopic image is perceived such that the more the scaling ratio increases, the deeper the stereoscopic image moves, and the deeper the stereoscopic image exists, the deeper the stereoscopic image moves.

As can be understood by comparing this drawing and FIG. 6, the scaling processing with the frame inner side positions as references indicates the same tendency as with the shift processing regarding change in stereoscopic image distance. For example, according to scaling processing with the frame inner side positions of the scaling ratio r=101% with references, the same advantage as with the shift processing with the shift amount s=20 can be obtained. Also, according to scaling processing with the frame inner side positions of the scaling ratio r=99% with references, the same advantage as with the shift processing with the shift amount s=−20 can be obtained. Accordingly, the scaling processing with the frame inner side positions as references can be performed instead of the shift processing serving as the first step image conversion.

Now, in order to consider a case where scaling processing with the frame inner side positions as references, and scaling processing with the frame centers as references are executed with the framework of the shift processing and the scaling processing with the frame centers as references, expression modifications are performed as follows.

$$x''L = r1 r0(xL - (r0-1)(xLR - xLC)/r0 - xLC) + xLC$$

$$x''R = r1 r0(xR - (r0-1)(xRL - xRC)/r0 - xRC) + xRC$$

That is to say, shift processing with shift amount (2(r0−1)(xLR−xLC)/r0) is performed as to the left image, which is equivalent to perform scaling processing with the frame centers of the scaling ratio r1r0 as references. Also, shift processing with shift amount (−2(r0−1)(xRL−xLC)/r0) is performed as to the right image, which is equivalent to perform scaling processing with the frame centers of the scaling ratio r1r0 as references.

Image Conversion by Scaling Processing with Frame Outer Side Positions as References FIG. 17 is a diagram illustrating the modes of the scaling processing with the frame outer side positions as references at the image conversion unit 250 according to an embodiment of the present invention. (a) in FIG. 17 is the left and right images in a state in which the scaling ratio r=1, i.e., no scaling processing has been performed. The coordinate of the pixel of interest in the horizontal (x) direction of the left image is taken as xL, and the left edge coordinate is taken as xLL. Also, the coordinate of the pixel of interest in the horizontal direction of the right image is taken as xR, and the right edge coordinate is taken as xRR.

(b) in FIG. 17 is a diagram illustrating a state in which the scaling ratio r>1, i.e., the entire screen is subjected to enlargement processing in the horizontal direction with each of the frame inner positions of the left and right images as a reference. At this time, the entire screen is enlarged so that the coordinate of the pixel of interest in the horizontal direction of the left image is changed from the xL to x'L. Similarly, the entire screen is enlarged so that the coordinate of the pixel of interest in the horizontal direction of the right image is changed from the xR to x'R. There is no change regarding the left edge coordinate xLL of the left image, and the right edge coordinate xRR of the right image, serving as the reference positions of the left and right images.

(c) in FIG. 17 is a diagram illustrating a state in which the scaling ratio r<1, i.e., the entire screen is subjected to reduction processing in the horizontal direction with the frame outer positions of the left and right images as references. At this time, the entire screen is in a state in which there is no original image on the image frame portion, and accordingly, processing for inserting an image, such as black or white or the like, is performed. There is no change regarding the left edge coordinate xLL of the left image, and the right edge coordinate xRR of the right image, serving as the reference positions of the left and right images.

If we say that the pixel of the coordinates (x, y) is taken as p(x, y), and the pixels of interest on the left and right images are taken as p(xL, yL) and p(xR, yR), pixels p(x'L, y'L) and p(x'R, y'R) on the left and right images after disparity control according to the scaling ratio r become as follows, respectively.

$$p(x'L, y'L) = p(r(xL-xLL)+xLL, yL)$$

$$p(x'R, y'R) = p(r(xR-xRR)+xRR, yR)$$

Figure 18:
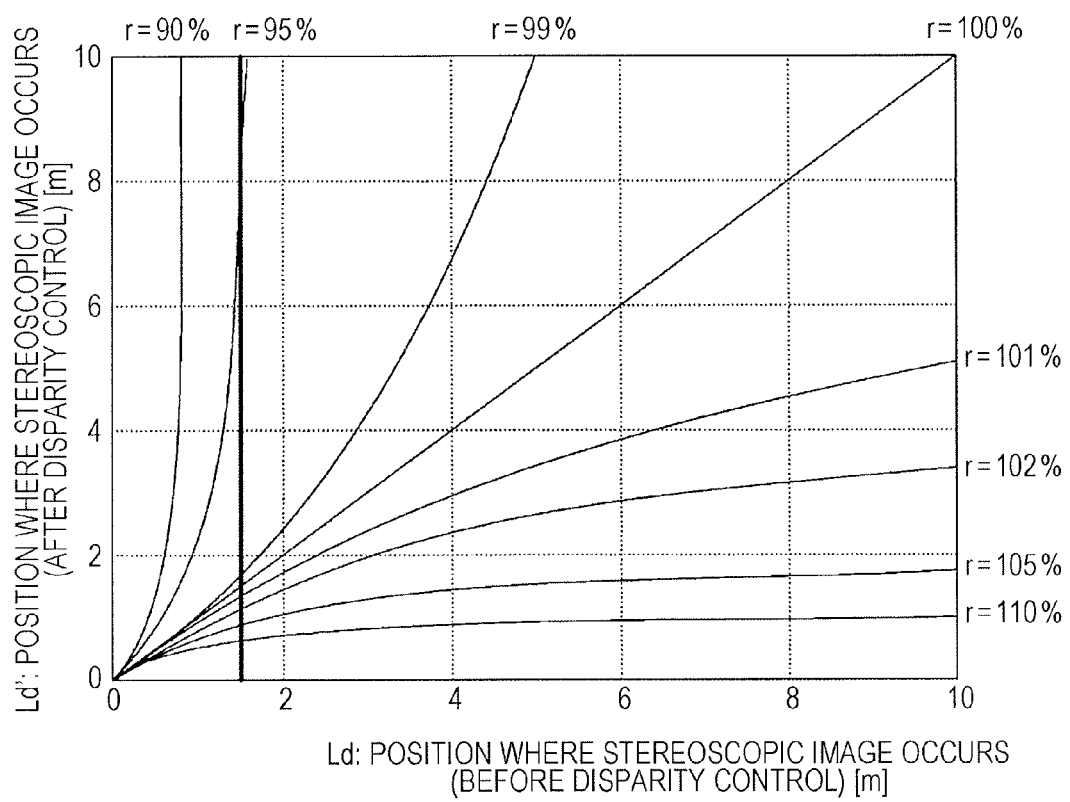
FIG. 18 is a graph illustrating relationship of change in stereoscopic image distance before and after the scaling processing with the frame outer side positions according to an embodiment of the present invention as references.

FIG. 18 is a graph illustrating relationship of change in stereoscopic image distance before and after the scaling processing with the frame outer side positions as references, according to an embodiment of the present invention. A vertical thick line indicates a position of the display surface of the stereoscopic display, and 1.5 [m] is assumed here.

In the event that the reduction processing has been performed (r<1), the stereoscopic image is perceived such that the stereoscopic image moves nearer. At this time, the stereoscopic image is perceived such that the smaller the scaling ratio becomes, the nearer the stereoscopic image moves, and the deeper the stereoscopic image exists, the nearer the stereoscopic image moves. On the other hand, in the event that the enlargement processing has been performed (r>1), the stereoscopic image is perceived such that the stereoscopic image has moved deeper. At this time, the stereoscopic image is perceived such that the more the scaling ratio increases, the deeper the stereoscopic image moves, and the deeper the stereoscopic image exists, the deeper the stereoscopic image moves.

As can be understood by comparing this drawing and FIG. 6, the scaling processing with the frame outer side positions as references indicates the same tendency as with the shift processing regarding change in stereoscopic image distance. For example, according to scaling processing with the frame outer side positions of the scaling ratio r=101% with references, the same advantage as with the shift processing with the shift amount s=20 can be obtained. Also, according to scaling processing with the frame outer side positions of the scaling ratio r=99% with references, the same advantage as with the shift processing with the shift amount s=−20 can be obtained. Accordingly, the scaling processing with the frame outer side positions as references can be performed instead of the shift processing serving as the first step image conversion.

Now, in order to consider a case where scaling processing with the frame outer side positions as references, and scaling processing with the frame centers as references are executed with the framework of the shift processing and the scaling processing with the frame centers as references, expression modifications are performed as follows.

$$x''L = r1r0(xL-(r0-1)(xLL-xLC)/r0-xLC)+xLC$$

$$x''R = r1r0(xR-(r0-1)(xRR-xRC)/r0-xRC)+xRC$$

That is to say, shift processing with shift amount (2(r0−1)(xLL−xLC)/r0) is performed as to the left image, which is equivalent to perform scaling processing with the frame centers of the scaling ratio r1r0 as references. Also, shift processing with shift amount (−2(r0−1)(xRR−xLC)/r0) is performed as to the right image, which is equivalent to perform scaling processing with the frame centers of the scaling ratio r1r0 as references.

Figure 19:
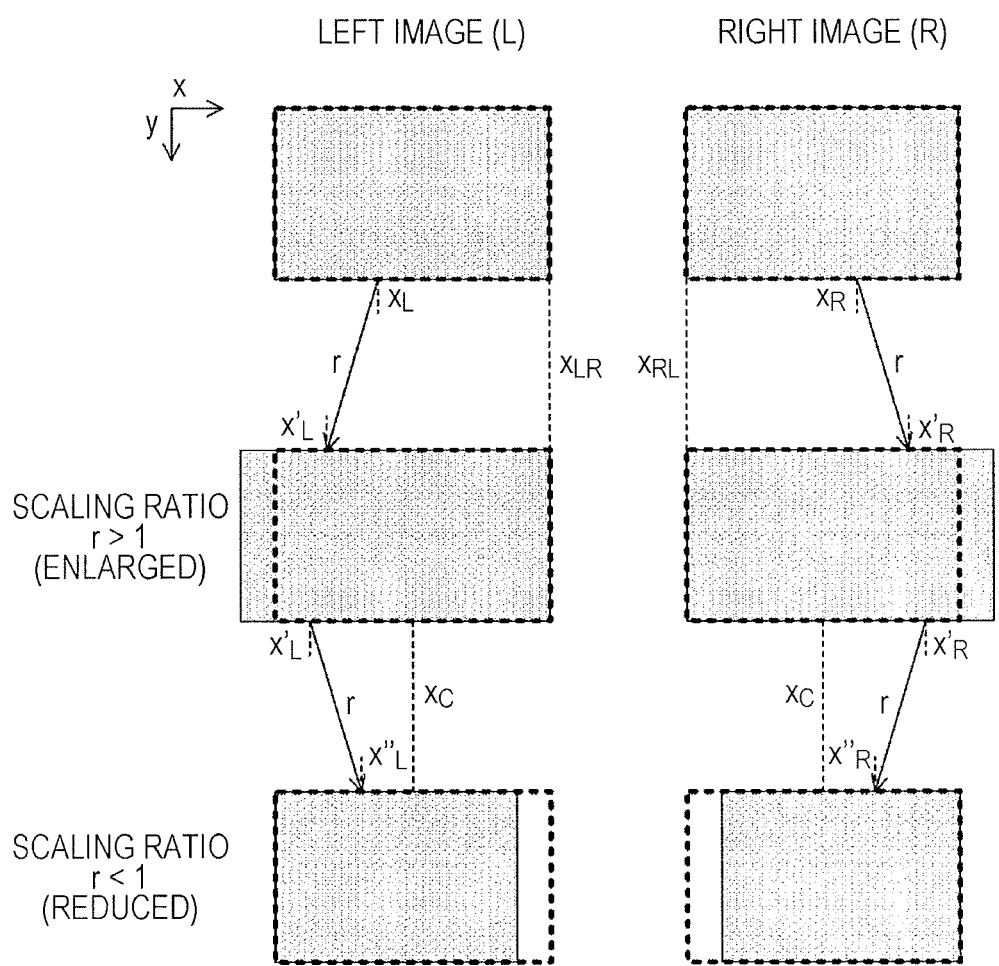
FIG. 19 is a diagram illustrating a first specific example by scaling processing of two steps according to an embodiment of the present invention.

FIG. 19 is a diagram illustrating a first specific example by scaling processing of two steps according to an embodiment of the present invention. With this example, scaling processing with the frame inner side positions as references is performed as the first step image conversion. Thus, the entire screen is enlarged so that the coordinate of the pixel of interest in the horizontal direction of the left image is changed from the xL to x'L, and the entire screen is enlarged so that the coordinate of the pixel of interest in the horizontal direction of the right image is changed from the xR to x'R. At this time, there is no change regarding the right edge coordinate xLR of the left image, and the left edge coordinate xRL of the right image, serving as the reference positions of the left and right images.

Also, scaling processing with the frame center positions as references is performed as the second step image conversion. Thus, the entire screen is reduced so that the coordinate of the pixel of interest in the horizontal direction of the left image is changed from the x'L to x"L, and the entire screen is reduced so that the coordinate of the pixel of interest in the horizontal direction of the right image is changed from the x'R to x"R. At this time, the entire screen is in a state in which there is no original image on the image frame portion, and accordingly, processing for inserting an image, such as black or white or the like, is performed. The image necessary for this insertion processing can further be reduced as compared to the case of performing shift processing as the first step image conversion.

In this way, the scaling processing with the frame inner positions as references is performed as the first step image conversion, and the scaling processing with the frame center positions as references is performed as the second step image conversion, whereby image insertion such as black around the image frame can be suppressed to the minimum.

If we say that the scaling ratio of the first step image conversion is r0, and the scaling ratio of the second step image conversion is r1, pixels p(x"L, y"L) and p(x"R, y"R) on the left and right images in the event of applying both are as follows, respectively.

$$p(x''L,y''L)=p(r1(r0(xL-xLR)+xLR-xLC)+xLC,yL)$$

$$p(x''R,y''R)=p(r1(r0(xR-xRL)+xRL-xRC)+xRC,yR)$$

The coordinate conversions of scaling of multiple steps may be executed together by the above expressions, and also may be executed by dividing these into two steps.

Figure 20:
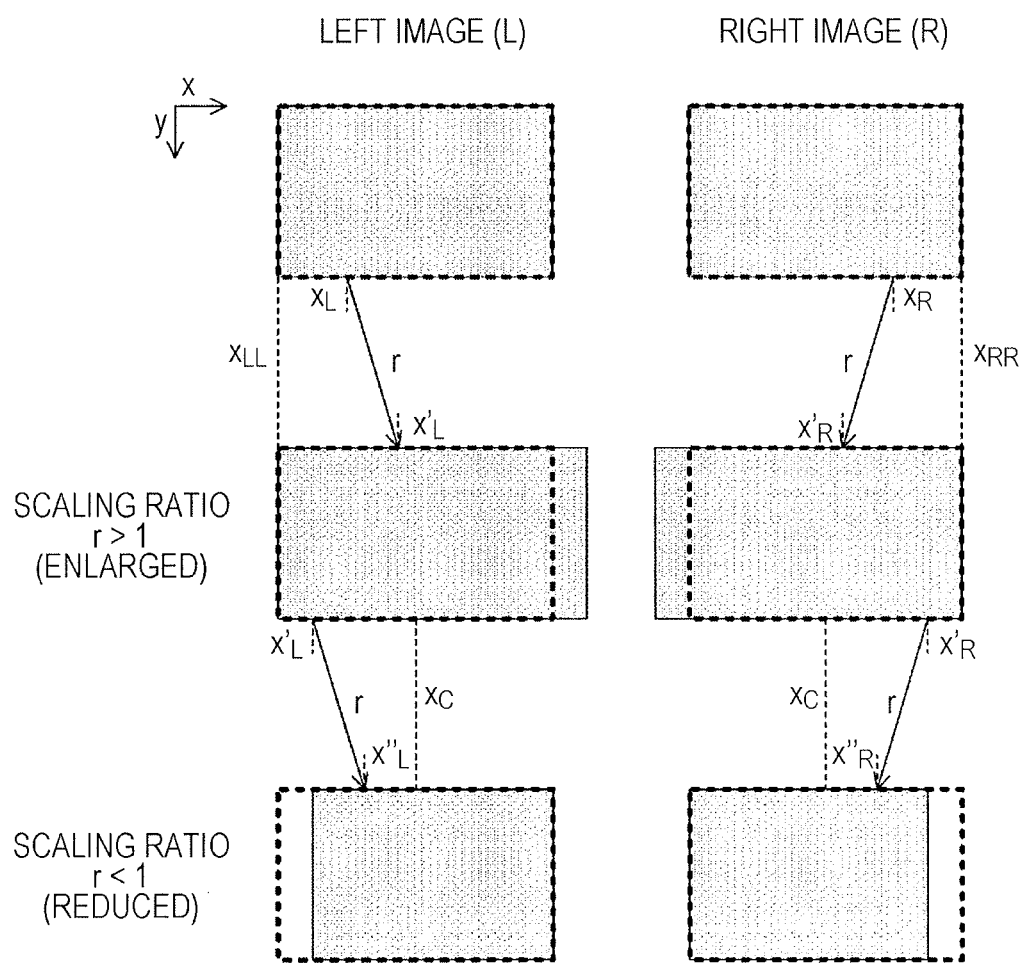
FIG. 20 is a diagram illustrating a second specific example by the scaling processing of two steps according to an embodiment of the present invention.

FIG. 20 is a diagram illustrating a second specific example by scaling processing of two steps according to an embodiment of the present invention. With this example, scaling processing with the frame outer side positions as references is performed as the first step image conversion. Thus, the entire screen is enlarged so that the coordinate of the pixel of interest in the horizontal direction of the left image is changed from the xL to x'L, and the entire screen is enlarged so that the coordinate of the pixel of interest in the horizontal direction of the right image is changed from the xR to x'R. At this time, there is no change regarding the left edge coordinate xLL of the left image, and the right edge coordinate xRR of the right image, serving as the reference positions of the left and right images.

Also, scaling processing with the frame center positions as references is performed as the second step image conversion. Thus, the entire screen is reduced so that the coordinate of the pixel of interest in the horizontal direction of the left image is changed from the x'L to x"L, and the entire screen is reduced so that the coordinate of the pixel of interest in the horizontal direction of the right image is changed from the x'R to x" R. At this time, the entire screen is in a state in which there is no original image on the image frame portion, and accordingly, processing for inserting an image, such as black or white or the like, is performed. The image necessary for this insertion processing can further be reduced as compared to the case of performing shift processing as the first step image conversion.

In this way, the scaling processing with the frame outer positions as references is performed as the first step image conversion, and the scaling processing with the frame center positions as references is performed as the second step image conversion, whereby image insertion such as black around the image frame can be suppressed to the minimum.

If we say that the scaling ratio of the first step image conversion is r0, and the scaling ratio of the second step image conversion is r1, pixels p(x"L, y"L) and p(x"R, y"R) on the left and right images in the event of applying both are as follows, respectively.

$$p(x''L,y''L)=p(r1(r0(xL-xLL)+xLL-xLC)+xLC,yL)$$

$$p(x''R,y''R)=p(r1(r0(xR-xRR)+xRR-xRC)+xRC,yR)$$

The image conversions of scaling of multiple steps may be executed together by the above expressions, and also may be executed by dividing these into two steps.

Cubic Interpolation

Figure 21:
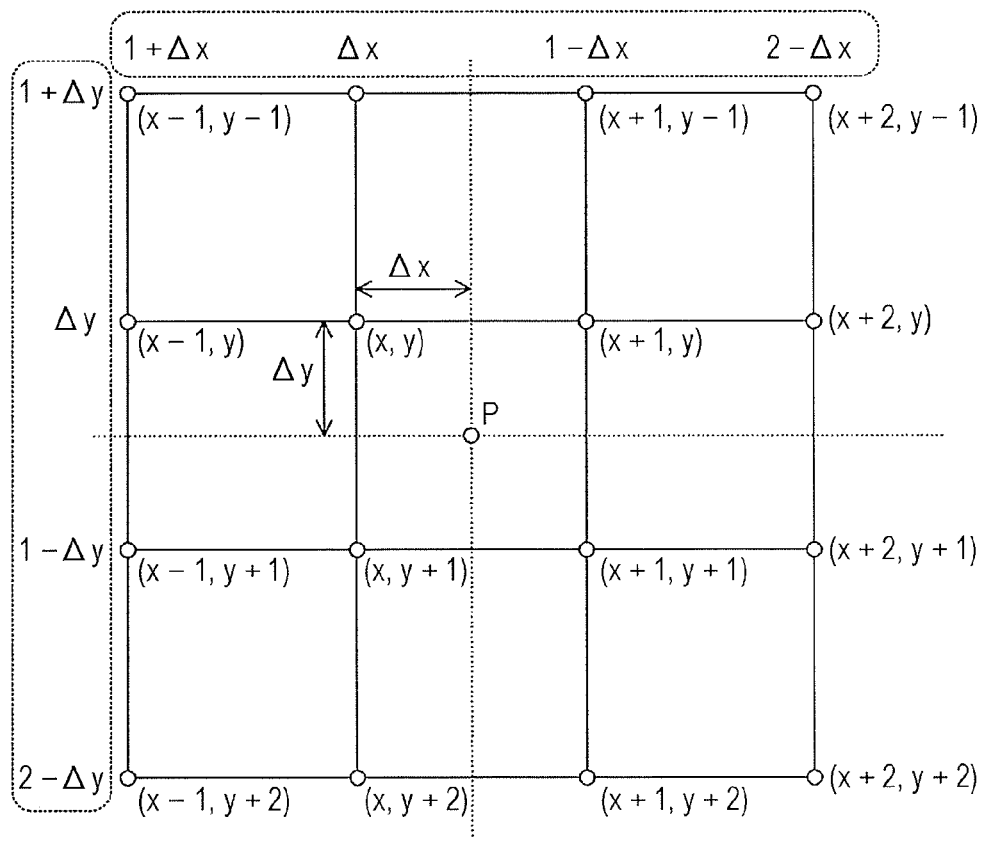
FIG. 21 is a diagram illustrating an example in the event of performing cubic interpolation in an embodiment of the present invention.

FIG. 21 is a diagram illustrating an example in the event of performing cubic interpolation with an embodiment of the present invention. With an embodiment of the present invention, there is a case where coordinates are needed not only in increments of pixels but also in increments of sub pixels depending on the scaling ratio. Therefore, description will be made regarding an example for applying cubic interpolation as a method for obtaining the pixel of coordinates equivalent to a pixel or less.

It is assumed to obtain a pixel by taking advantage of 4×4 taps around a generated pixel P. If we say that the integer portion of the coordinates of the generated pixel P are taken as (x, y), the tap of a filter is taken as p(x+i, y+j), and a filter coefficient is taken as wi, j, the generated pixel P is represented by the following expression.

$$P = \sum_{i=-1}^{2}\sum_{j=-1}^{2} W_{i,j} p(x+i, y+j) \qquad \text{[Mathematical Expression 6]}$$

Now, the filter coefficient W is obtained as follows according to distance between the generated pixel P and the tap.

$$W = 1 - 2d2 + d3 \qquad (d < 1)$$
$$= 4 - 8d + 5d2 - d3 \quad (1 \leq d < 2)$$
$$= 0 \qquad (d \geq 2)$$

For example, weight W−1, −1 of a coefficient corresponding to the pixel of (x−1, y−1) are represented with horizontal $Wx=4-8(1+\Delta x)+5(1+\Delta x)2-(1+\Delta x)3$ horizontal $Wy=4-8(1+\Delta y)+5(1+\Delta y)2-(1+\Delta y)3$ being multiplied.

$$W-1,-1=WxWy$$

Here, (Δx, Δy) becomes the decimal-point portion of the generate pixel P.

Recommended Setting Range of Disparity Control Parameter

FIG. 22 is a diagram an example of the recommended setting range of the disparity control parameter according to the first embodiment of the present invention. As described above, with an embodiment of the present invention, though image conversion of two steps is performed at the image conversion unit 250, the setting of the disparity control parameter in this case has flexibility. Here, exemplification will be made regarding the recommended setting range of the disparity control parameter as a target for setting.

First, in the event of performing shift processing as image conversion, it is recommended to set a value from −128 pixel to +128 pixel as the shift amount s. Note that in the event that the shift amount s>0, shift processing is performed in a direction where the left and right images recede to each other, and in the vent that the shift amount s<0, shift processing is performed in a direction where the left and right images approach to each other. This shift processing is assumed to be used as the first step image conversion.

Also, in the event of performing scaling processing as image conversion, it is recommended to set a 0.8 to 1.20-fold value as the scaling ratio r. Note that in the event that the scaling ratio r>1, scaling processing for enlargement is performed, and in the event that the scaling ratio r<1, scaling processing for reduction is performed. Also, as for the reference position at the time of scaling processing, it is recommended to set ones of the frame center positions (FIG.

8 and others), frame inner positions (FIG. 15 and others), and frame outer positions (FIG. 17 and others). Scaling processing with the frame center positions as references is assumed to be used as the second step image conversion. Scaling processing with the frame inner side or outer side positions as references is assumed to be performed instead of shift processing at the first step.

Abstraction Disparity Control Parameter

FIG. 23 is a diagram illustrating an example of an abstraction disparity control parameter according to the first embodiment of the present invention. With the first embodiment of the present invention, it is premised on some sort of disparity control parameter being input by the operation acceptance unit 290, but an advantage obtained by a combination of parameters differs, and accordingly, it is not necessarily simple to set a suitable value. Therefore, as an example for facilitating setting of a disparity control parameter, description will be made regarding an example using an abstraction disparity control parameter.

Now, abstraction disparity control parameters of four steps of "strong", "middle", "weak", and "off" are assumed as an example of strength of disparity control. Disparity control is performed most strongly in the event of "strong", the strength of disparity control is weakened as the strength is changed from "strong" to "weak", and no disparity control is performed in the event of "off". In the event of "strong", shift processing with the shift amount s=60 pixels is performed as the first step image conversion, and scaling processing with the frame centers as references of the scaling ratio r=0.85 times is performed as the second step image conversion. In the event of "middle", shift processing with the shift amount s=40 pixels is performed as the first step image conversion, and scaling processing with the frame centers as references of the scaling ratio r=0.90 times is performed as the second step image conversion. In the event of "weak", it is handled that shift processing with the shift amount s=0 pixel has been performed as the first step image conversion, i.e., actual image conversion has not been performed. In this case, scaling processing with the frame inner sides of the scaling ratio r=1.03 times as references is performed as the second step image conversion. In the event of "off", it is handled that shift processing with the shift amount s =0 pixel has been performed as the first step image conversion, i.e., actual image conversion has not been performed. In this case, it is handled that scaling processing with the scaling ratio r=1.00 times has been performed as the second step image conversion, i.e., actual image conversion has not been performed.

In this way, by allowing the user to select out of the abstraction disparity control parameters of the four steps that have been preset, the disparity control parameter can be readily specified. In this case, the disparity control unit 240 generates a specific disparity control parameter based on the abstraction disparity control parameter to control the image conversion unit 250.

<2. Second Embodiment>

Configuration of Disparity Conversion Device

Figure 24:
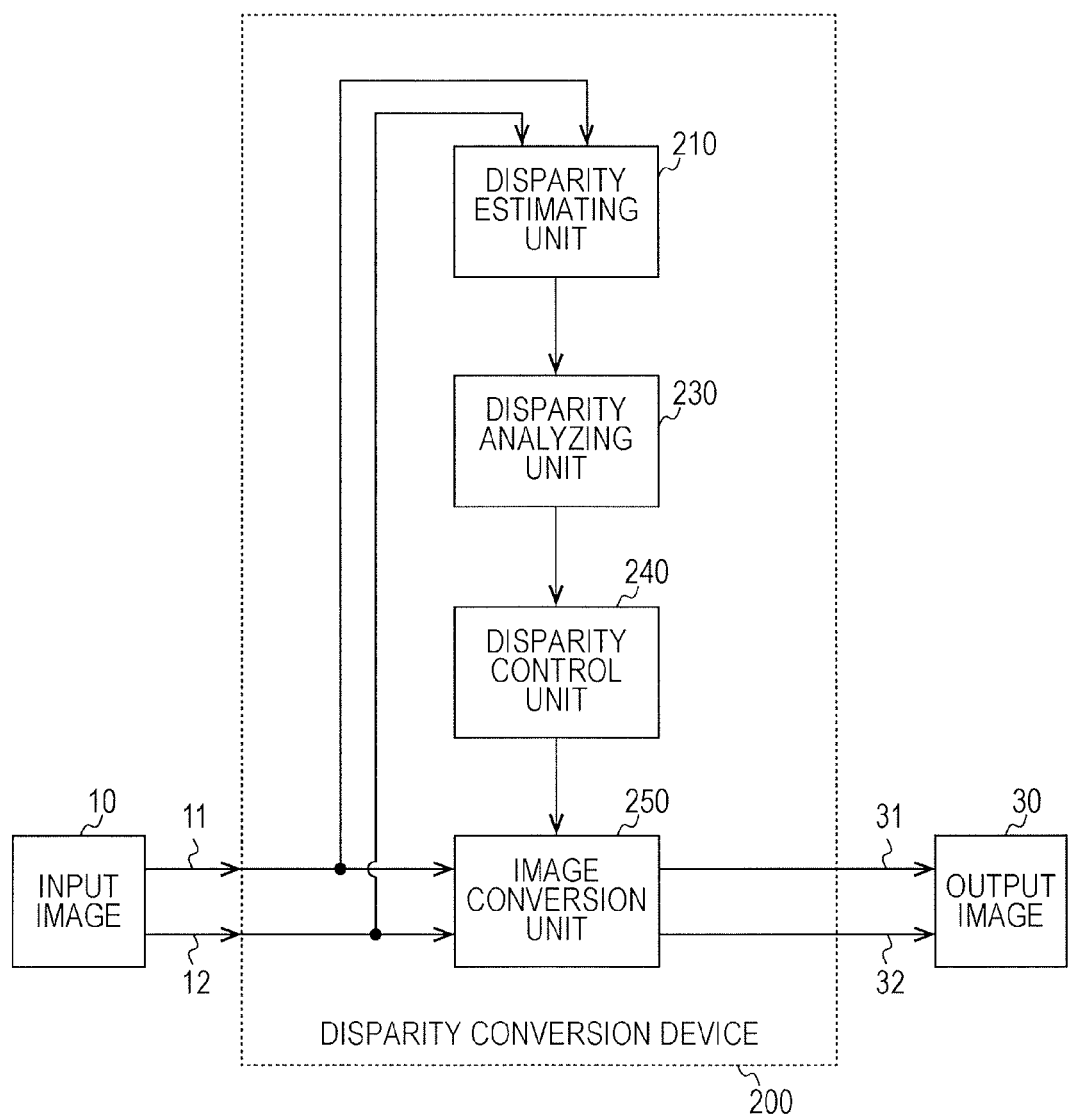
FIG. 24 is a diagram illustrating a configuration example of a disparity conversion device 200 according to a second embodiment of the present invention.

FIG. 24 is a diagram illustrating a configuration example of a disparity conversion device 200 according to a second embodiment of the present invention. With the above first embodiment, an arrangement has been made wherein input of a disparity control parameter is accepted at the operation acceptance unit 290, but with this second embodiment, an arrangement is considered wherein disparity is estimated and analyzed based on the content of the left and right images to generate a disparity control parameter. The disparity conversion device 200 according to this second embodiment includes a disparity estimating unit 210 and a disparity analyzing unit 230 instead of the operation acceptance unit 290 according to the first embodiment.

The disparity estimating unit 210 is a unit configured to estimate disparity from the left image 11 and right image 12 of the input image 10 to generate a disparity map. This disparity map holds disparity for each pixel or for each pixel group of the input image 10. In this case, either the left image 11 or the right image 12 may be taken as a reference as the input image 10. An estimation method for disparity is a known technique, and a technique has been known wherein the disparity of each of the left and right images is estimated to generate a disparity map by performing matching regarding the foreground images obtained by removing the background images from the left and right images, for example (e.g., see Japanese Unexamined Patent Application Publication No. 2006-114023).

The disparity analyzing unit 230 is a unit configured to analyze the disparity map estimated at the disparity estimating unit 210 to generate a disparity control parameter for performing suitable disparity control. Specifically, the disparity analyzing unit 230 generates a disparity histogram form the disparity map to determine a disparity control parameter so that the distribution of this histogram is included in a suitable range.

Shift Processing and Disparity Histogram

FIG. 25 is a diagram a relation example of shift processing and a disparity histogram, according to the second embodiment of the present invention. (a) in FIG. 25 is an example of a disparity histogram before shift processing, and (b) in FIG. 25 is an example of a disparity histogram after the shift processing. According to the shift processing, it can be understood that the average of the disparity distribution moves from the near side to the depth side of the display surface of the display.

As for a calculation expression of the shift amount s in the shift processing, the following expression is available.

$$s[\text{pixels}] = \alpha \times \text{intra-image disparity average [pixels]} - \beta \times \text{intra-image disparity deflection [pixels]} - \gamma$$

Here, $\alpha$, $\beta$, and $\gamma$ are parameter values that can arbitrarily be set. For example, with a 42-V television set, it is conceived to set these such that $\alpha=1.0$ or so, $\beta=1.5$ or so, and $\gamma=20.0$ or so. An arrangement may be made wherein these parameter values are set to a default value beforehand, and are subsequently changed according to the user's preference. Note that in the event of setting that $\alpha=1.0$, $\beta=0.0$, and $\gamma=20.0$, the average after the shift processing in (b) in FIG. 25 becomes −20.0.

Scaling Processing and Disparity Histogram

FIG. 26 is a diagram a relation example of scaling processing and a disparity histogram, according to the second embodiment of the present invention. (a) in FIG. 26 is an example of a disparity histogram before scaling processing, and (b) in FIG. 26 is an example of a disparity histogram after the scaling processing. According to the scaling processing, it can be understood that the distribution range of disparity is compressed.

As for a calculation expression of the scaling ratio r in the scaling processing, the following expression is available.

$$r[\text{times}] = \epsilon \times \text{intra-image disparity deflection [pixels]}$$

Also, the following expression is available as another expression.

$$r[\text{times}] = \text{comfortable disparity range [pixels]} / \text{intra-image disparity range [pixels]}$$

Thus, disparity can be reduced by the scaling processing so that the disparity range within an image is included in the comfortable disparity range. Here, as for the comfortable disparity range, with the above "3DC Safety Guidelines", around 100 pixels are defined in the standard visual distance of the 42-V television set.

In this way, according to the second embodiment of the present invention, a disparity control parameter is generated based on the disparity histogram generated from the left and right images, whereby image conversion can be performed using this disparity control parameter.

Disparity Control Parameter Based on Stress Value

Figure 27:
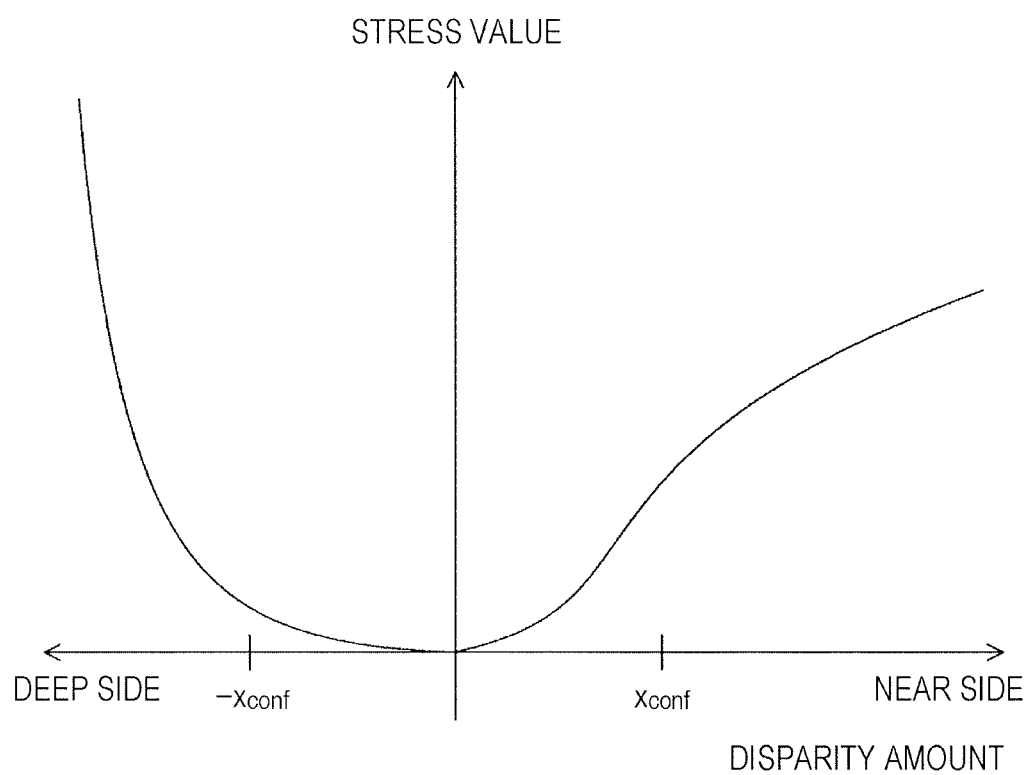
FIG. 27 is a diagram illustrating an example of relationship between disparity and a stress value.

FIG. 27 is a diagram illustrating an example of relationship between disparity and a stress value. With the example so far, assumption has been made wherein a disparity control parameter is generated based on a disparity histogram, but here, as a modification, a stress value at the time of newly listening in to a stereoscopic image is defined, thereby determining a disparity control parameter so that the stress value thereof becomes the minimum.

A stress value en of a pixel n is defined by the following expression with the disparity of the pixel n as xn.

$$en = f(xn)$$

Here, f(x) is a function representing relationship between the disparity and stress, and indicates relationship such as FIG. 27, for example. This function is, with between −x conf<x<x conf, $$f(x) = \lambda x2,$$

and with x conf<x, $$f(x) = 2\lambda x \text{ conf}(x - x \text{ conf}) + \lambda x \text{ 2conf}$$

and with x<−x conf, $$f(x) = x\ 4/2\ x\ 2\text{conf} + x\ 2\text{conf}/2.$$

This function indicates that the higher the stress value is as the position moves upwards. Specifically, with the nearer side than the display surface of the stereoscopic display, the nearer the position is, the higher the stress value is. On the other hand, with the deeper side than the display surface of the stereoscopic display, the stress value is low within a suitable range, but the stress value suddenly increases when the position is deeper than a fixed position. This is because the greater the stress value is when exceeding a comfortable disparity range, and the stress extremely increases when disparity is deeper than both-eye distance. Also, the stress is conceived to be smaller on the nearer side than the depth side in the event of exceeding the comfortable disparity range. Here, the comfortable disparity range is around "±50 pixel" at the standard visual distance of the 46-V type. Also, the depth position where disparity is greater than both-eye distance is equivalent to around "−100 pixel" at the standard visual distance of the 46-V type.

If we say that the shift amount in shift processing is taken as x shift, and the scaling amount in scaling processing is taken as a scale, a stress value e'n after these processes is represented by the following expression.

$$e'n = f(a \text{ scale} \cdot xn - x \text{ shift})$$

Therefore, according to this modification, a disparity control parameter can be determined by obtaining the shift amount x shift and scaling amount a scale whereby total amount E' of the stress values of the entire screen becomes the minimum.

Processing Procedure of Disparity Conversion

Figure 28:
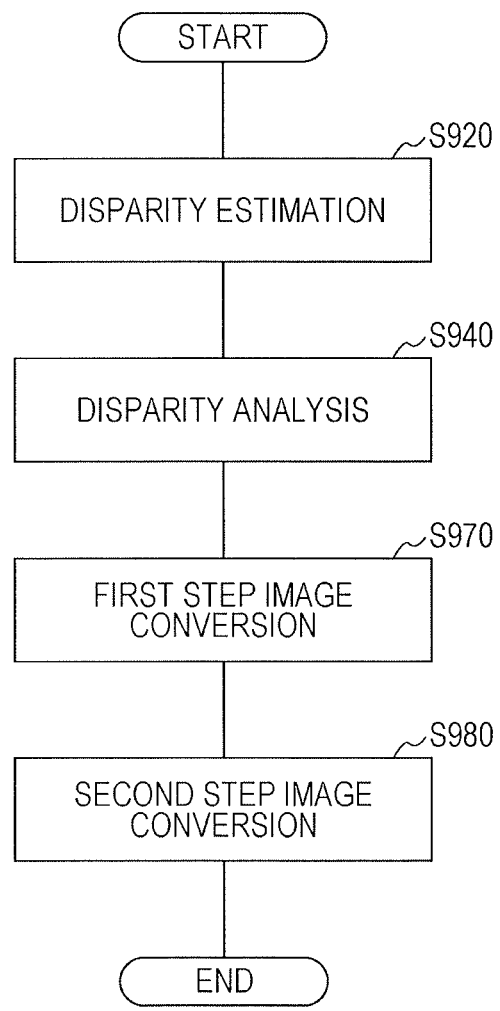
FIG. 28 is a flowchart illustrating a procedure example of disparity conversion processing according to the second embodiment of the present invention.

FIG. 28 is a flowchart illustrating a procedure example of disparity conversion processing according to the second embodiment of the present invention. First, the disparity estimating unit 210 estimates disparity from the left image 11 and right image 12 of the input image 10 to generate a disparity map (step S920). Subsequently, the disparity analyzing unit 230 analyzes this generated disparity map to generate a disparity control parameter for performing suitable disparity control (step S940). In accordance with this disparity control parameter, the disparity control unit 240 performs control as to the image conversion unit 250. With the image conversion unit 250, the first step image conversion is performed at the left image pre-conversion unit 251 and right image pre-conversion unit 252 (step S970). Subsequently, the second step image conversion is performed at the left image post-conversion unit 253 and right image post-conversion unit 254 (step S980).

<3. Third Embodiment>

Configuration of Disparity Conversion Device

Figure 29:
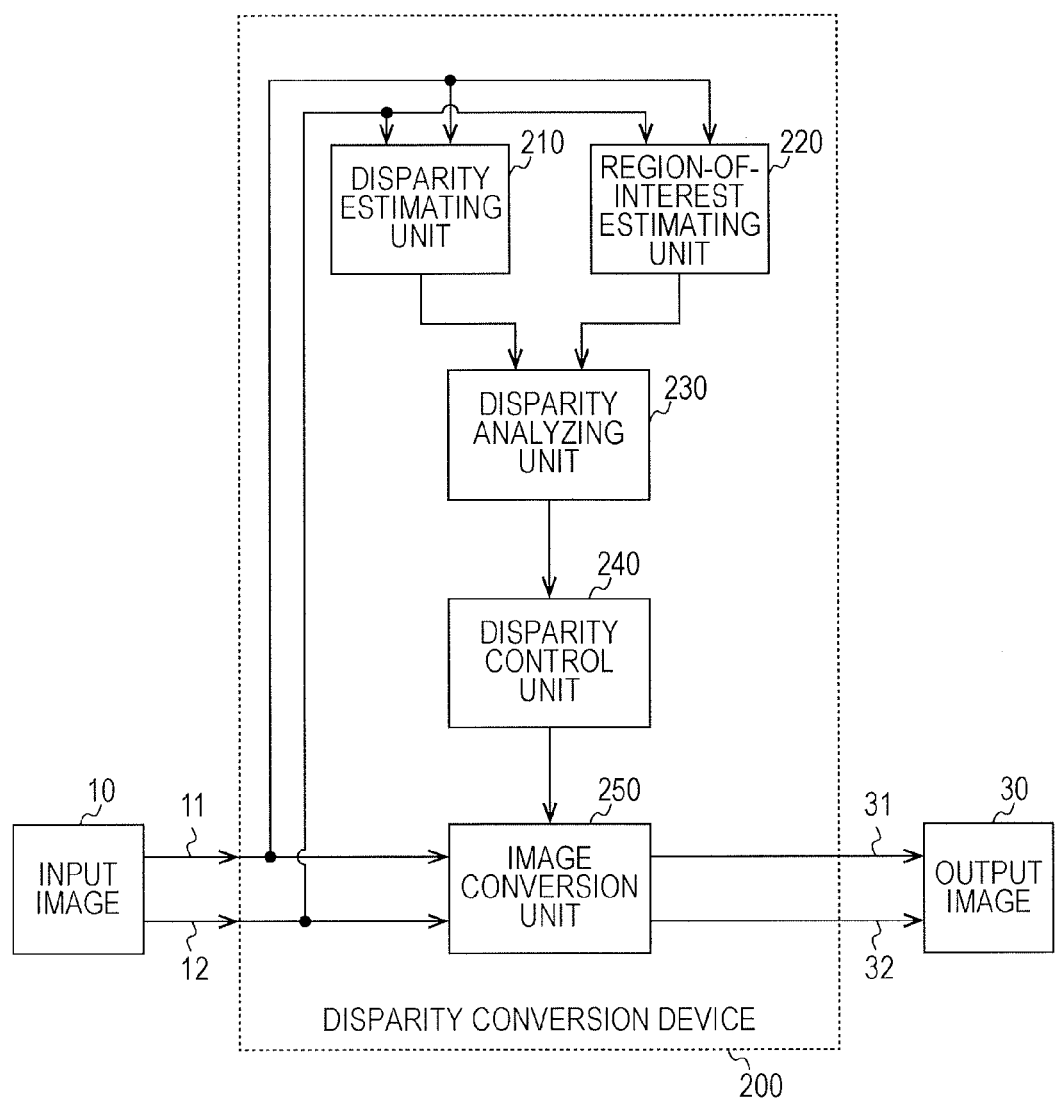
FIG. 29 is a diagram illustrating a configuration example of a disparity conversion device 200 according to a third embodiment of the present invention.

FIG. 29 is a diagram illustrating a configuration example of a disparity conversion device 200 according to a third embodiment of the present invention. With this third embodiment, a region-of-interest estimating unit 220 is further provided to the above second embodiment. This region-of-interest estimating unit 220 is a unit configured to estimate a region of interest such as a subject or image frame or the like in the left image 11 and right image 12 of the input image 10. Based on the disparity map generated by the disparity estimating unit 210, and a region-of-interest map generated by the region-of-interest estimating unit 220, the disparity analyzing unit 230 calculates a disparity histogram with weight in consideration of influence of an image frame or subject. The disparity control unit 240 and image conversion unit 250 are the same as those in the above first or second embodiment.

Region-of-interest Map and Disparity Histogram

FIG. 30 is a diagram illustrating a specific example of disparity conversion processing according to the third embodiment of the present invention. (a) in FIG. 30 is an image example of an input image, which is actually made up of a left image and a right image. (b) in FIG. 30 is an example of a disparity map generated by the disparity estimating unit 210. (c) in FIG. 30 is an example of a region-of-interest map in consideration of an image frame generated by the region-of-interest estimating unit 220. (d) in FIG. 30 is an example of a region-of-interest map focused on a subject generated by the region-of-interest estimating unit 220.

The region-of-interest map indicates the position and degree of a region of interest in the input image, and indicates that the whiter the region is, the higher the influence ratio, the degree of interest is. Specifically, in (c) in FIG. 30, a portion near the image frame is white, which indicates that the influence of this portion needs to be considered. On the other hand, in (d) in FIG. 30, a region corresponding to a person is white, which indicates that the influence of this portion needs to be considered.

FIG. 31 is a diagram illustrating a specific example of a disparity histogram according to the third embodiment of the present invention. With the above second embodiment, the disparity map is used as it is at the disparity analyzing unit 230, and a disparity histogram such as (a) in FIG. 31 is generated, for example. Note that, with the disparity histogram, the left side represents deeper than the display surface of the stereoscopic display, and the right side represents nearer than the display surface of the stereoscopic display.

On the other hand, with this third embodiment, the region-of-interest map generated by the region-of-interest estimating unit 220 is added, and accordingly, a disparity histogram with weight such as (b) in FIG. 31 is generated, for example. With this disparity histogram with weight, influence due to the image frame is added to the nearest portion. Also, influence due to a person is added to around the center. The disparity analyzing unit 230 generates a disparity histogram with weight to which such influence, influence in the region of interest is added, and determines a disparity control parameter so that the distribution of this histogram is included in a suitable range.

Processing Procedure of Disparity Conversion

Figure 32:
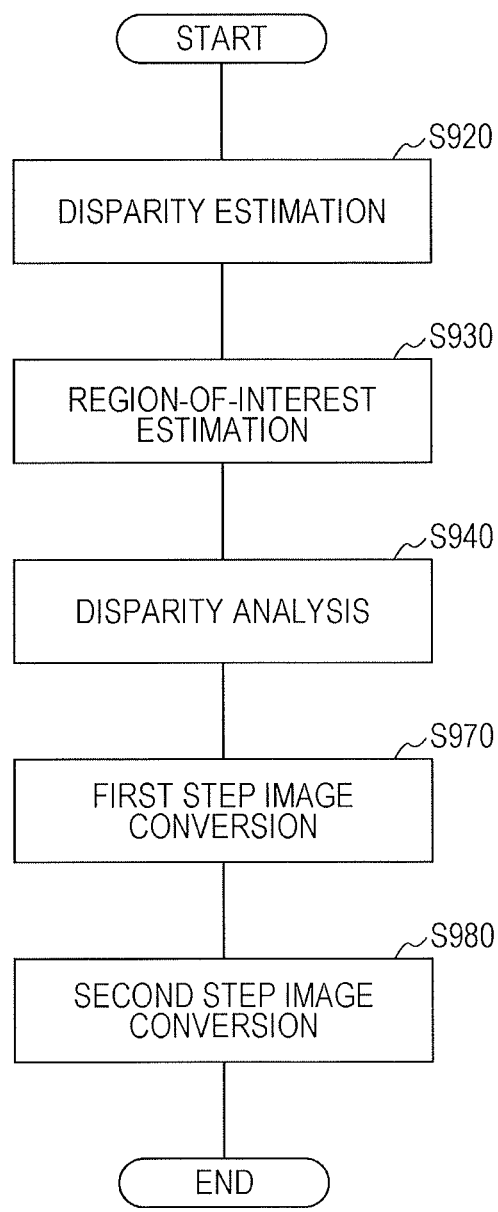
FIG. 32 is a flowchart illustrating a procedure example of disparity conversion processing according to the third embodiment of the present invention.

FIG. 32 is a flowchart illustrating a procedure example of disparity conversion processing according to the third embodiment of the present invention. First, the disparity estimating unit 210 estimates disparity from the left image 11 and right image 12 of the input image 10 to generate a disparity map (step S920). Also, the region-of-interest estimating unit 220 estimates a region of interest such as a subject, image frame, or the like (step S930). Subsequently, the disparity analyzing unit 230 analyzes the disparity map in consideration of the estimated influence in the region of interest to generate a disparity control parameter for performing suitable disparity control (step S940). In accordance with this disparity control parameter, the disparity control unit 240 performs control as to the image conversion unit 250. With the image conversion unit 250, the first step image conversion is performed at the left image pre-conversion unit 251 and right image pre-conversion unit 252 (step S970). Subsequently, the second step image conversion is performed at the left image post-conversion unit 253 and right image post-conversion unit 254 (step S980).

In this way, according to the third embodiment of the present invention, a disparity control parameter is generated in consideration of influence in the region of interest, whereby image conversion can be performed with this disparity control parameter.

<4. Fourth Embodiment>

Configuration Example of Disparity Conversion Device

Figure 33:
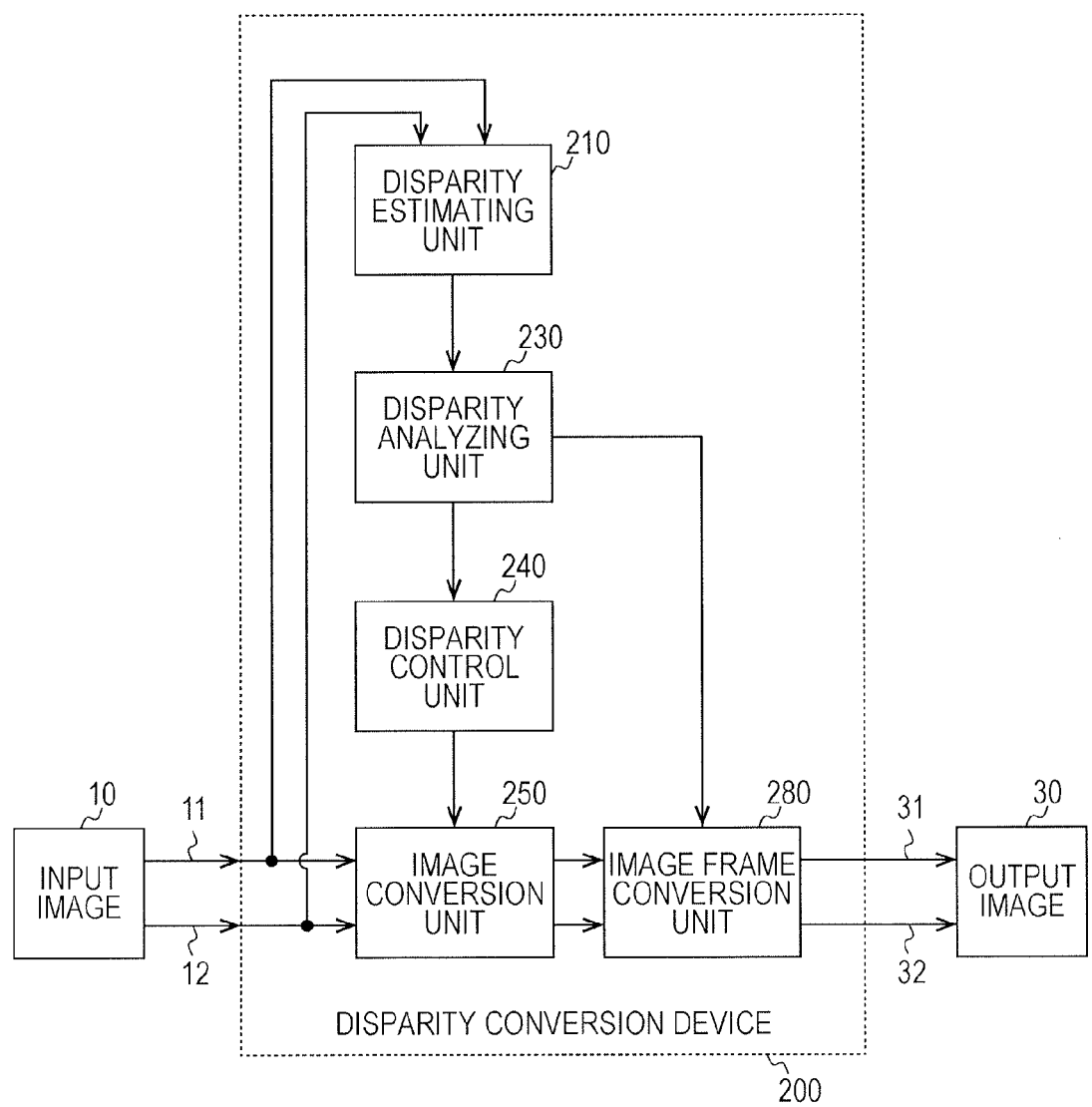
FIG. 33 is a diagram illustrating a configuration example of a disparity conversion device 200 according to a fourth embodiment of the present invention.

FIG. 33 is a diagram illustrating a configuration example of a disparity conversion device 200 according to a fourth embodiment of the present invention. With this fourth embodiment, an image frame conversion unit 280 is further provided to the above second embodiment. This image frame conversion unit 280 is a unit configured to convert an image so as to fill an uncomfortable region displayed on only one eye of a viewer in the region around the image frame.

Existence of an object protruding around the image frame tends to give impression to the effect that the object is hard to see, to the viewer. On the other hand, an object receding around the image frame is not frequently hard to see. Accordingly, an uncomfortable region displayed on only one eye is a region where the image is input to only one eye of the viewer, and is also a region protruding nearer than the display surface of the display. Such an uncomfortable region is distinguishable using a depth map. With this fourth embodiment, let us say that an uncomfortable region is determined at the disparity analyzing unit 230 with a depth map being assumed to be generated at the disparity estimating unit 210. Based on the determination result at the disparity analyzing unit 230, the image is converted at the image frame conversion unit 280 so as to fill an uncomfortable region displayed on only one eye of the viewer.

Image Frame Circumference and Disparity Control

FIG. 34 is a diagram illustrating a state example before and after processing by the image conversion unit 280 according to the fourth embodiment of the present invention. (a) in FIG. 34 is a state before the processing by the image frame conversion unit 280, and a tree exists on a region that is input to only the left eye, and also protrudes nearer than the display surface of the display. In this drawing, a gray portion is a region that is input to only one eye, and also protrudes nearer than the display surface of the display, which is an uncomfortable region. On the other hand, a shadow portion is a region that is input to only one eye, and recedes deeper than the display surface of the display, which is not an uncomfortable region. The above tree hangs on the gray portion and consequently exists in the uncomfortable region.

(b) in FIG. 34 is a state after the processing by the image frame conversion unit 280. Here, an uncomfortable region in the left image is filled with black. This is equivalent to changing the gray portion. Thus, the tree which exists in the uncomfortable region is eliminated from the image, whereby displeasure can be reduced.

Processing Procedure of Disparity Conversion

Figure 35:
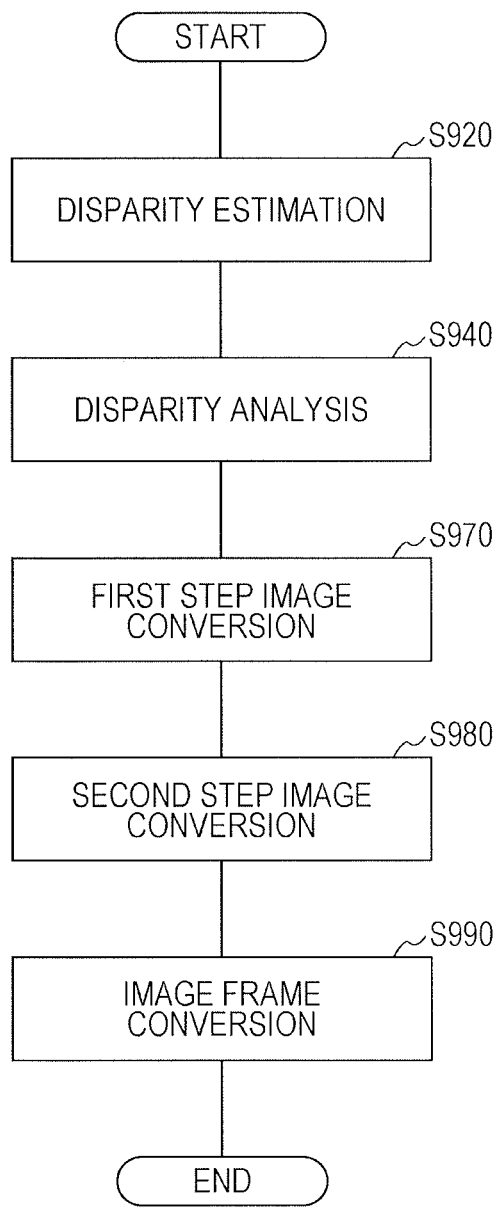
FIG. 35 is a flowchart illustrating a procedure example of disparity conversion processing according to the fourth embodiment of the present invention.

FIG. 35 is a flowchart illustrating a procedure example of disparity conversion processing according to the fourth embodiment of the present invention. From step S920 to step S980 perform the same processing as with the above second embodiment. Subsequently, upon the image conversion of two steps at the image conversion unit 250 being completed (steps S970 and S980), the image frame conversion unit 280 converts the image so as to fill an uncomfortable region displayed on only one eye around the image frame (step S990).

In this way, according to the fourth embodiment of the present invention, the image is converted so as to fill an uncomfortable region displayed on only one eye around the image frame, whereby displeasure at the time of stereopsis can be reduced.

<5. Modifications>

With the above embodiments, description has been made assuming scaling processing for performing enlargement/reduction in the horizontal direction alone, but the present invention is not restricted to this, and enlargement/reduction may also be performed in the vertical direction at the same time. In this case, control can be performed so as to maintain the aspect ratio, but circumstances in the horizontal direction such as overflow of an image at the time of enlargement, image insertion processing of a image frame portion at the time of reduction, and so forth may be caused in the same way as with the vertical direction.

Also, with the above embodiments, description has been made regarding convergence to a comfortable range of a stereoscopic image by the image conversion of two steps serving as the first embodiment, and generation of a disparity control parameter based on a disparity histogram serving as the second embodiment. Further, description has been made regarding correspondence to a region of interest serving as the third embodiment, and correspondence to around an image frame serving as the fourth embodiment. These may be carried out by being combined as appropriate. For example, after performing correspondence to a region of interest according to the third embodiment, correspondence to around an image frame according to the fourth embodiment may be performed.

Note that the embodiments of the present invention illustrate an example for realizing the present invention, and as apparently illustrated in the embodiments of the present invention, the matters in the embodiments of the present invention, and the invention specification matters in the Claims have a corresponding relation, respectively. Similarly, the invention specification matters in the Claims, and matters in the embodiments of the present invention denoted with the same name have a corresponding relation, respectively. However, the present invention is not restricted to the embodiments, and can be realized by subjecting the embodiments to various modifications without departing from the essence of the present invention.

Also, the processing procedures described in the embodiments of the present invention may be taken as a method having these series of procedures, or may be taken as a program causing a computer to execute these series of procedures through a recording medium for recording the program thereof. As for this recording medium, for example, CD (Compact Disc), MD (MiniDisc), DVD (Digital Versatile Disk), memory cards, Blu-ray Disc (registered trademark), or the like may be employed.

Reference Signs List 100 image storage device
200 disparity conversion device
210 disparity estimating unit
220 region-of-interest estimating unit
230 disparity analyzing unit
240 disparity control unit
250 image conversion unit
251 left image pre-conversion unit
252 right image pre-conversion unit
253 left image post-conversion unit
254 right image post-conversion unit
280 image frame conversion unit
290 operation acceptance unit
300 display control device
400 image display device

The invention claimed is:

1. An image processing apparatus comprising:
circuitry configured to
perform a first image conversion process on a left image and a right image serving as an input stereoscopic image;
perform a second image conversion process on the left image and the right image converted by the first image conversion process, the second image conversion process including an enlargement/reduction process with center positions of the left image and right image as references;
estimate regions of interest in the left image and the right image of the input stereoscopic image to generate a region-of-interest map illustrating positions and degrees of interest in the input stereoscopic image; and
determine a disparity control parameter such that a total number of disparities of the region-of-interest are within a predetermined disparity range.

2. The image processing apparatus according to claim 1, wherein, as part of the first image conversion process, the circuitry is further configured to
shift relative positions of the left image and the right image in a horizontal direction;
perform the enlargement/reduction process with inner positions of the left image and right image as references; and
perform the enlargement/reduction process with outer positions of the left image and right image as references.

3. The image processing apparatus of claim 1, wherein the circuitry is further configured to:
estimate disparity from the left image and right image of the input stereoscopic image to generate a disparity map that holds disparity for each pixel or each pixel group;
analyze the disparity map to generate a disparity control parameter so that the distribution of the disparity in the input stereoscopic image is included in a predetermined range; and
control image conversion for the first and second image conversion processes based on the disparity control parameter.

4. The image processing apparatus of claim 1, wherein the circuitry is further configured to:
calculate a disparity histogram based on the disparity map and the region-of-interest map,
wherein the disparity histogram includes a left side representing a deeper than a display surface of a stereoscopic display and includes a right side representing a nearer than the display surface of the stereoscopic display.

5. The image processing apparatus of claim 4, wherein the disparity histogram includes a weight factor associated with an influence of an image frame or subject within the region-of-interest.

6. The image processing apparatus of claim 5, wherein the region-of-interest map illustrates that the degree of interest increases with a degree of whiteness in the region displayed.

7. The image processing apparatus of claim 1, wherein the circuitry is further configured to determine a disparity control parameter to minimize a total amount of predetermined stress values of the input stereoscopic image.

8. The image processing apparatus of claim 1, wherein the circuitry is further configured to
define a range of stereopsis including a first range on a nearer side of a 3D view and a second range on a deeper side of the 3D view, the nearer side being a side beyond a display surface displaying the stereoscopic image, and
position content of the input stereoscopic image between the first range and the second range based on performing the first image conversion process and the second image conversion process.

9. An image processing method comprising:
performing, with circuitry, a first image conversion process on a left image and a right image serving as an input stereoscopic image;
performing, with the circuitry, a second image conversion process, on the left image and the right image converted by the first image conversion process, the second image conversion process including enlargement/reduction process with center positions of the left image and right image as references;
estimating, with the circuitry, regions of interest in the left image and the right image of the input stereoscopic image to generate a region-of-interest map illustrating positions and degrees of interest in the input stereoscopic image; and
determining, with the circuitry, a disparity control parameter such that a total number of disparities of the region-of-interest are within a predetermined disparity range.

10. An image processing apparatus comprising:
circuitry configured to
display a stereoscopic image in a 3-dimensional (3D) view, the stereoscopic image including a left side image and a right side image;
perform a shifting process of the left side image and the right side image to change a disparity amount of the input stereoscopic image to a nearer side of the 3D view or a deeper side of the 3D view of a display surface of a stereoscopic display depending on a depth disparity amount between the left side image and right side image; and perform a scaling process to change a range in a depth direction of the input stereoscopic image, the scaling process includes shifting positions of the left side image and the right side image in a horizontal direction using inner positions of the left side image and the right side image as reference points.

11. The image processing apparatus of claim 10, wherein the shifting process includes shifting the left side image and the right side image toward one another or shifting the left side image and the right side image away from one another.

12. The image processing apparatus of claim 10, wherein a pixel located on an inner position of the left side image or the right side image is shifted by a smaller scale than a pixel located on an outer position of the left side image or the right side image.

* * * * *